United States Patent [19]
Sperling

[11] 4,024,505
[45] May 17, 1977

[54] INTERFACE SYSTEM FOR COUPLING AN INDETERMINATE NUMBER OF PERIPHERAL DEVICES TO A CENTRAL PROCESSING UNIT

[75] Inventor: Irving Sperling, Santa Monica, Calif.

[73] Assignee: Compucorp, Los Angeles, Calif.

[22] Filed: Nov. 18, 1974

[21] Appl. No.: 524,802

[52] U.S. Cl. .............................................. 340/172.5
[51] Int. Cl.² .................... G06F 3/04; G06F 11/00
[58] Field of Search ...... 340/172.5, 147, 146.1 BA; 360/48, 49, 50, 53; 179/15 AL; 235/153 A, 153 AP

[56] References Cited
UNITED STATES PATENTS

| | | | |
|---|---|---|---|
| 3,307,152 | 2/1967 | Robbins | 340/172.5 |
| 3,336,582 | 8/1967 | Beausoleil et al. | 340/172.5 |
| 3,377,619 | 4/1968 | Marsh et al. | 340/172.5 |
| 3,439,344 | 4/1969 | Stanga | 340/172.5 |
| 3,534,337 | 10/1970 | Martin et al. | 340/172.5 |
| 3,623,039 | 11/1971 | Barham | 360/49 X |
| 3,633,169 | 1/1972 | Bickford | 340/172.5 |
| 3,651,474 | 3/1972 | Liberman | 340/172.5 |
| 3,656,125 | 4/1972 | Kanda et al. | 360/53 X |
| 3,710,324 | 1/1973 | Cohen et al. | 340/172.5 |
| 3,715,725 | 2/1973 | Kievit et al. | 340/147 |
| 3,732,543 | 5/1973 | Rocher et al. | 340/172.5 |
| 3,742,456 | 6/1973 | McFiggans et al. | 340/172.5 |
| 3,881,174 | 4/1975 | Barnich | 340/172.5 |
| 3,889,236 | 6/1975 | Herger et al. | 340/172.5 |
| 3,911,402 | 10/1975 | McLean et al. | 340/172.5 |
| 3,919,693 | 11/1975 | Anderson | 340/172.5 |

*Primary Examiner*—Melvin B. Chapnick
*Attorney, Agent, or Firm*—Lindenberg, Freilich

[57] ABSTRACT

A system is provided for coupling an indeterminate number of peripheral devices to a central processing unit (CPU) through a single receptacle. A cable connected to an interface unit (IU) of a first device plugs into the CPU receptacle. Cables of subsequent IUs are plugged into receptacles connected to earlier plugged IUs, thus connecting the cables of all devices in series and the device IU's themselves in parallel. One type of IU is for a magnetic tape cassette and includes a timeout circuit to determine when certain types of programming errors have occurred. A binary digit is set in a status register for that and other types of errors. The status register is read under program control of the CPU, thus providing for the flexibility of haulting operation or bypassing the program section having an error for unattended operation of the CPU.

22 Claims, 16 Drawing Figures

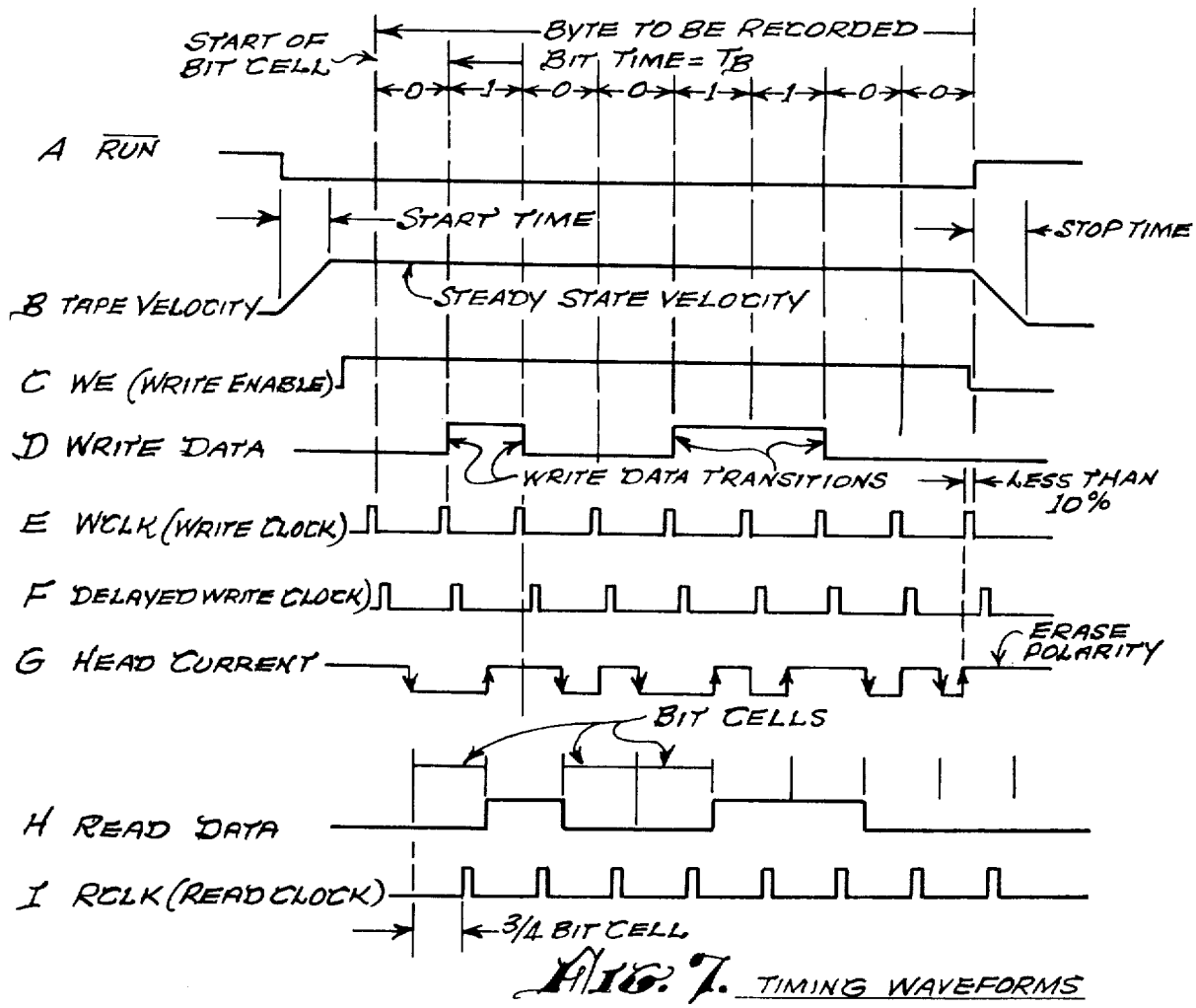
FIG. 7. TIMING WAVEFORMS
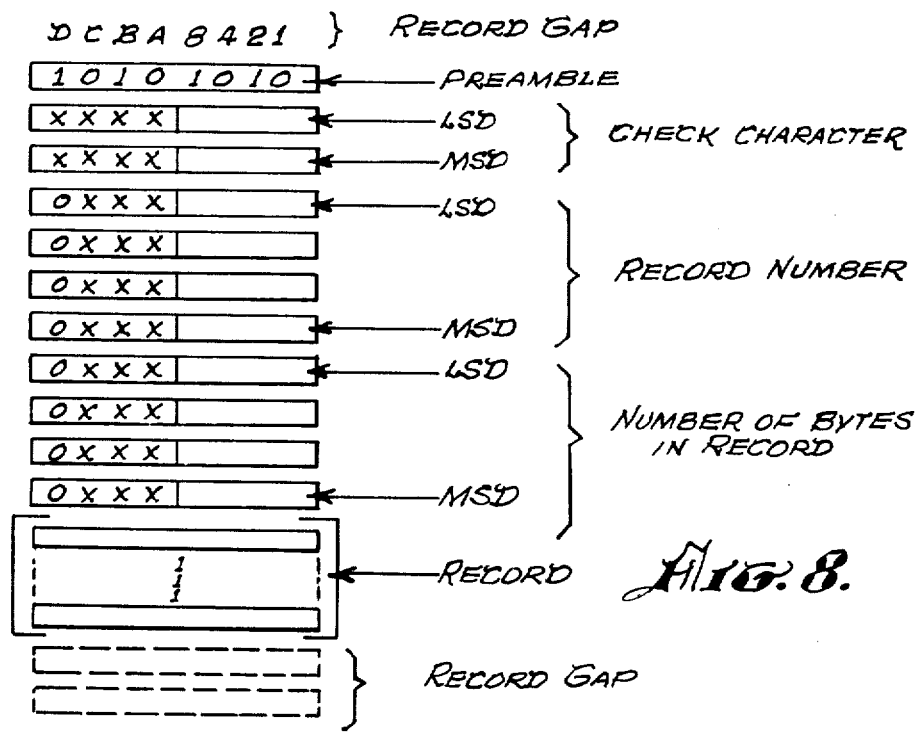
FIG. 8.

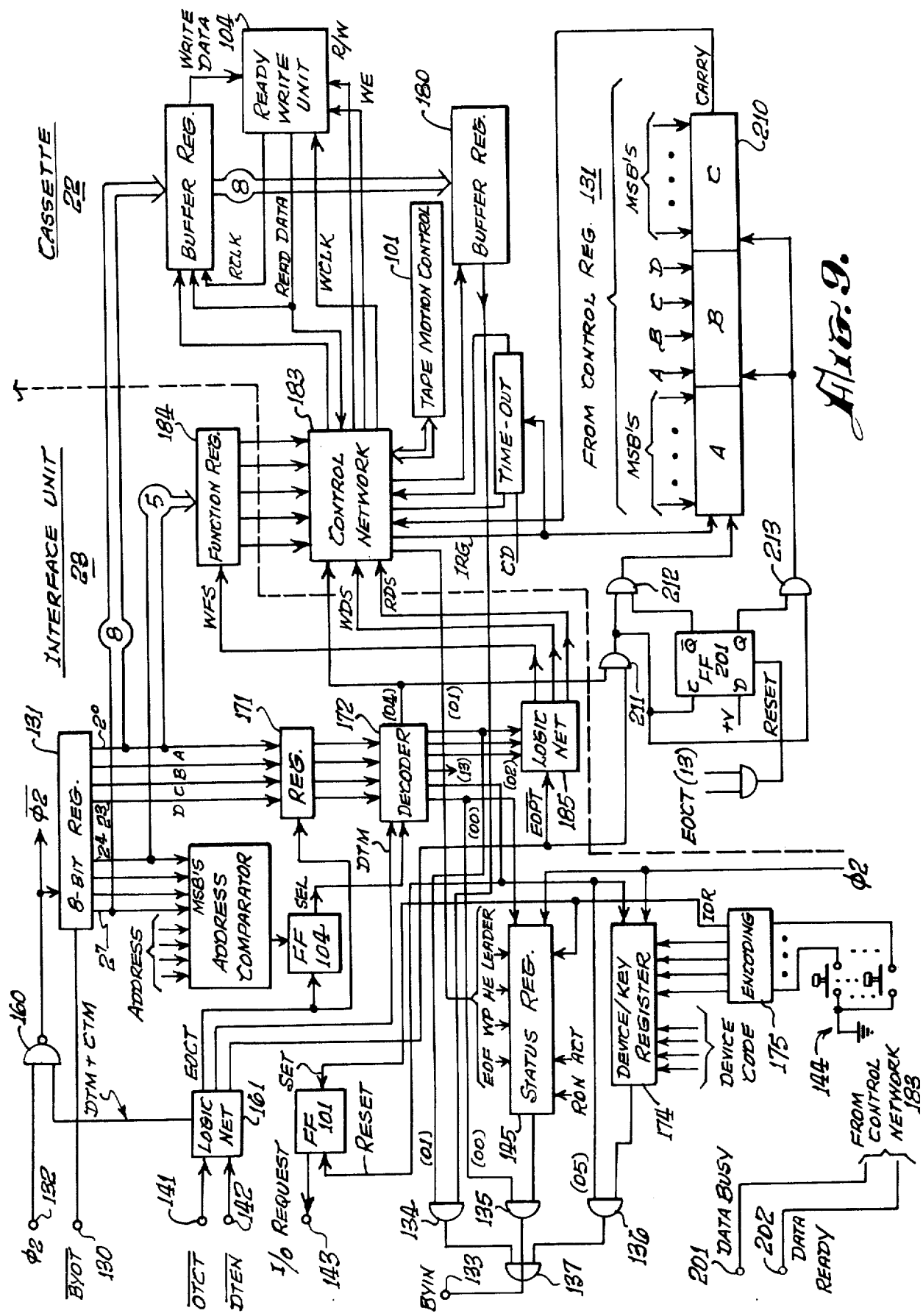

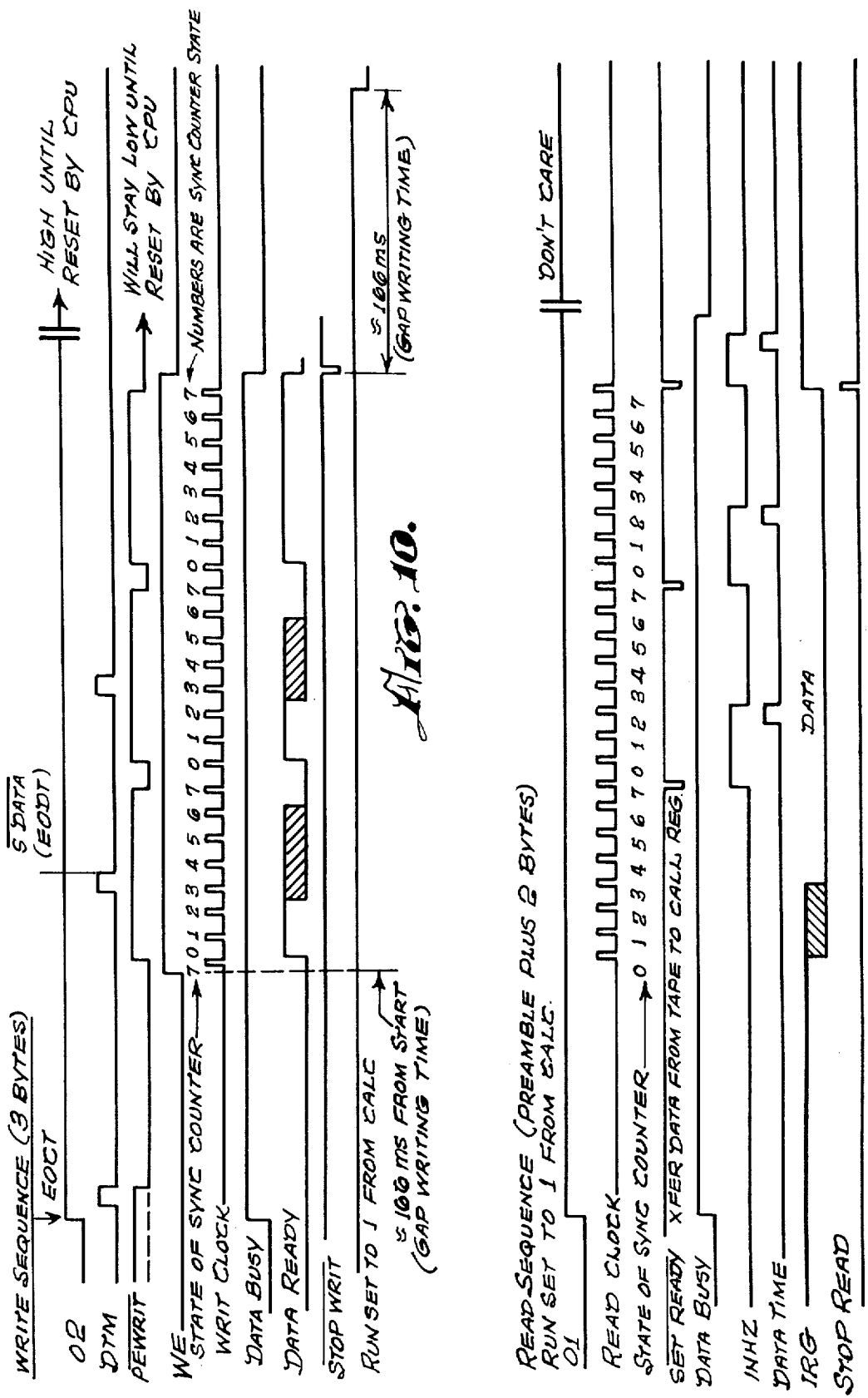

INTERFACE SYSTEM FOR COUPLING AN INDETERMINATE NUMBER OF PERIPHERAL DEVICES TO A CENTRAL PROCESSING UNIT

BACKGROUND OF THE INVENTION

This invention relates to a system for coupling a plurality of peripheral devices of different types to a central processing unit (CPU), and more particularly to a system which permits providing an indeterminate number of peripheral devices with two-way communication directly between the CPU and each peripheral device.

Data processing systems organized around a CPU (computer or calculator) generally include a carefully selected set of peripheral devices, such as typewriters, magnetic tape units, card readers, digital plotters, and the like. There are two approaches for providing two-way communications with the devices.

The first is for the CPU to decode an n-bit word to determine which of several devices is to be serviced, and to then activate the device through an interface unit having a connector assigned the n-bit code. The decoding and activating logic for all devices is constructed as an integral part of the interface unit. Consequently, the number and types of peripheral devices which can be connected is predetermined.

The second approach is to provide a predetermined number of controllers, each taking the place of an interface unit in the first approach, and connecting one or more devices to the controllers. This "corporate feed" arrangement thus provides for a larger number of peripheral devices, but the number of devices which can be serviced by a controller is again limited by its design. Consequently, the total number of devices that can be included is predetermined by the controller interface just as the number of devices is limited in the first approach. This approach does increase the total number of devices by a factor N, where N is the total number of controllers that may be addressed by a code using a predetermined number of bits, but there is the disadvantage of added expense in providing controllers. The expense is significant when considered from the point of view of the small user who, in the extreme, requires less than N devices, or requires N+1 devices and must therefore add another controller for the one added device. Worse yet, the CPU must have the capability of addressing the controller first in order to access a device.

OBJECTS AND SUMMARY OF THE INVENTION

An object of this invention is to provide for an indeterminate number of peripheral devices to be connected to a central processing unit for direct two-way communications, where the total number of devices is limited only by the number of unique address codes which can be formed from a predetermined number of digits. Another object is to provide a novel arrangement for direct communication between a central processing unit and a number of peripheral devices. Still another object is to provide an economical system of communication between a central processing unit and an indeterminate number of peripheral devices.

In the case of a magnetic tape IU, another object is to provide a timeout circuit to detect for an error in programming an operation which cannot be carried out, and to set an error bit in a resister read under program control to permit the programmer to have an option to either hault operation or bypass the program section.

These and other objects of the invention are achieved by providing a central processing unit (CPU) with a receptacle through which an interface unit (IU) of a peripheral device is connected by a cable, and providing the IU with another receptacle to which another similar IU may be connected by a cable. The cables of two or more IUs are thus connected in series while the IUs are thereby connected in parallel to the receptacle of the CPU. In that manner an indeterminate number of devices may be sequentially connected in any order to a maximum number of $2^n$ devices, where n is the number of bits in an address code. Each IU is connected to a particular device and is assigned a unique address code. The CPU puts out an address word consisting of an address code of the device to be selected and a mode control code. All IUs contain: an input register to receive this address word, logic to decode the address, and logic to set up the necessary mode control specified by the mode control code. Once addressed, the IU of the selected device is locked in for communication as required until released. Each IU also contains a function register which, once the IU is locked in upon being addressed, received function control bits via its input register. It also contains a data buffer register which receives data bytes (groups of data bits) via the input register for communication in one direction and the same or other buffer register for receiving data bytes directly from the device for communication in the other direction. Data is read into the CPU from a buffer register. The IU of each device also includes a status register and a keyboard register through which status bits of the device and keyboard entries, respectively, are read into the CPU. The control logic networks of an addressed device responds to the mode control code to latch the IU of the addressed device, and indicates the operation to be carried out, such as to read the IU status register, read data in, put data out, read the keyboard register, or output a function control code into the IU. The function control code is used to operate the device. All IUs receive address codes and function control codes, but only the IU addressed will be latched on to respond to following function codes.

While using a slow peripheral device, control logic means of the IU will generate an interrupt (INT2) signal, and store a bit in a unique position in the status register indicating it has done so, in order to signal to the CPU when it is ready with a data byte to be inputted, or when it is ready for another data byte to be outputted. Similarly, when the operator has depressed a key at a keyboard of the IU to manually initiate data transfer operations, keyboard control means will generate an I/0 request and store a bit in a unique position in the status register. The CPU may look at the INT2 line and the I/O request line. Since the I/O request line is common to all IUs, the CPU polls the status registers to determine which has an active I/O request. If more than one, the IU having the highest address will be serviced first. The INT2 line is also common to all IUs, although connected to only IUs servicing slow devices, so that all IUs must be polled to determine which has an active I/O request line.

A timeout circuit is provided to initiate an error indication which sets a binary digit in the status register during read, rewrite (write over an existing block of data) space and search operations if an interrecord gap is not detected within a maximum time, and during any operation including write, erase, and wind (forward and reverse) while on leader at either end of the tape. This permits the programmer to test for an error and, if an error is found, have the option to hault operation or continue on with subsequent instruction sets.

BRIEF DESCRIPTION OF THE DRAWINGS

FIG. 7 is a timing diagram for write and read operations in the cassette magnetic tape of FIG. 6.

FIG. 8 illustrates the format of a block of data stored in the cassette magnetic tape of FIG. 6.

FIG. 9 is a logic diagram of the interface unit of FIG. 6.

FIG. 10 is a timing diagram of a write sequence of the cassette interface unit.

FIG. 11 is a timing diagram of a read sequence of the cassette interface unit.

DESCRIPTION OF THE PREFERRED EMBODIMENTS

Figure 1:
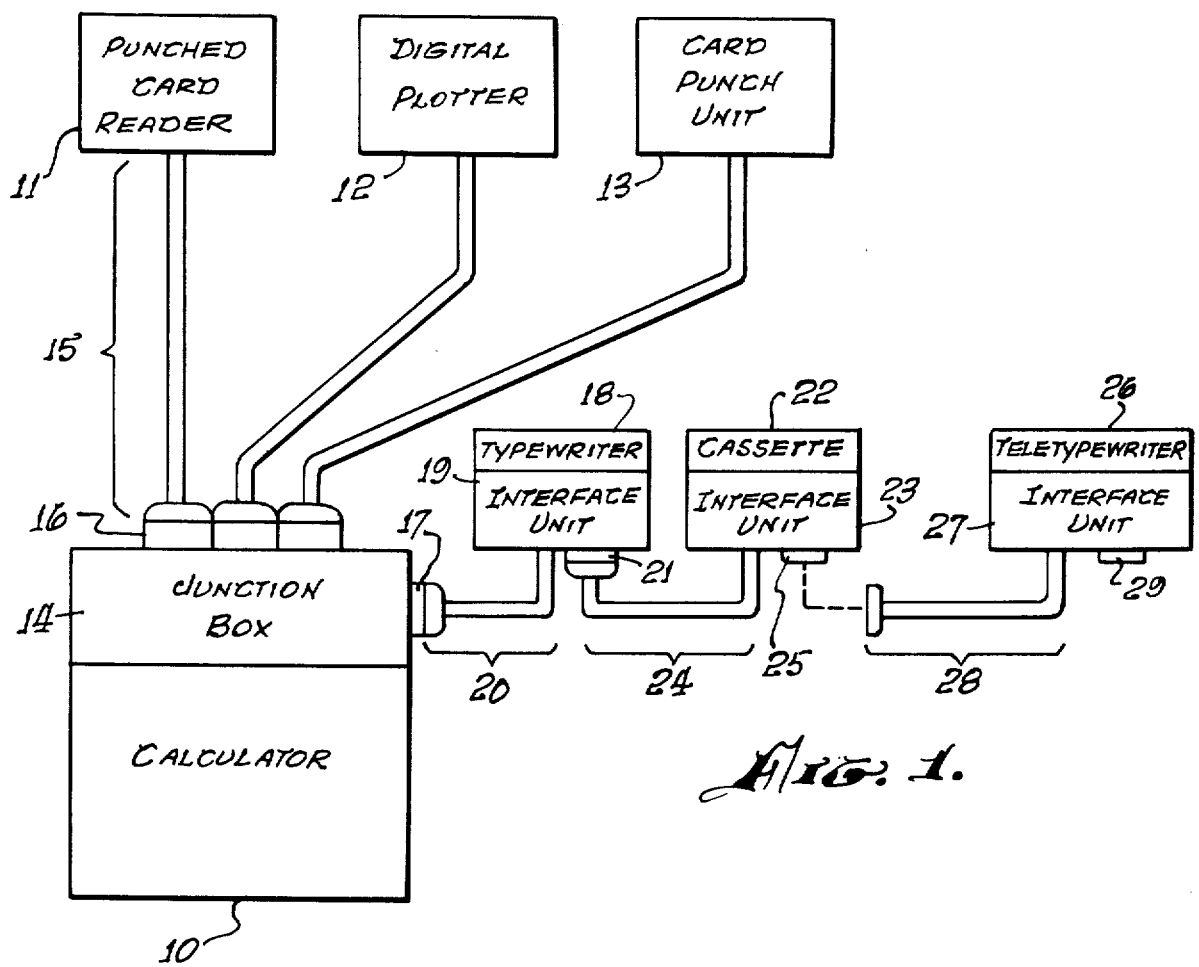
FIG. 1 illustrates a calculator with a fixed number of directly connected peripheral devices and an indeterminate number of additional devices connected to the calculator through a single receptacle on a junction box.

Referring now to FIG. 1, a calculator 10 is shown connected to a fixed number of peripheral devices, such as a punched card reader 11, a digital plotter 12 and a card punch unit 13. The punched card reader 11 is used to read program steps and data from punched cards. The program steps and data are stored directly in the memory of the calculator 10. The digital plotter 12 transforms computational results into graphic form. It plots functions, makes graphs, draws axis and does alphanumeric labeling. The card punch unit 13 stores information outputted by the calculator in conventional punched cards. Since each of these peripheral devices involves only one-way communication with the calculator 10, it is possible to economically connect each directly to the calculator 10 through a junction box 14, such as the punched card reader 11 connected by a cable and plug 15 to a receptable 16.

The calculator 10 is a keyboard calculator, and preferably one selected from a Series 400 manufactured by Computer Design Corporation, such as the Compucorp 425 Scientist. However, the calculator may be any central processing unit (CPU) having an arithmetic section, a sequence control section, an input-output section and a memory section, as well as a keyboard for manual programming, control and entry of data. Consequently, whenever used hereinafter in the description of an exemplary embodiment, the term "calculator" is intended to include all that the more generic term "central processing unit" encompasses.

Data processing systems organized around a CPU for different applications will require a different number of various types of peripheral devices, such as typewriters, teletypewriters, and magnetic tape cassette units, all of which involve two-way communications with the CPU, in addition to a more limited number of specialized peripheral devices, particularly those which involve only one-way communication. To accommodate an indeterminate number of additional peripheral devices which involve two-way communication, the junction box 14 is provided with a receptacle 17 to which a first peripheral device 18 is connected via an interface unit (IU) 19 by a plug and cable 20. The interface unit 19 is provided with a receptacle 21 to which a second peripheral device 22 may be connected via an interface unit 23 by a plug and cable 24. A receptacle 25 is similarly provided on the interface unit 23 to permit another peripheral device to be connected to the calculator 10 through the single receptacle 17 of the junction box 14, such as an additional peripheral device 26. That additional device also has an interface unit 27, an input plug and cable 28, and a receptacle 29 through which the input cable of still another peripheral device may be connected in series. When the peripheral devices are thus connected, each with its own interface unit, the input cables of all devices are connected electrically in series, and the interface units of all devices are connected electrically in parallel to the receptacle 17 by way of the series-connected cables.

In operation, the calculator will output a control word to all IUs to select a device. The control word includes: the address of the device to be selected, and a mode control code, such as a "status" mode control code to determine the status of the device being addressed. Upon receiving this mode control word, the addressed IU performs the necessary operation. In the case of the status mode control word, it transmits to the calculator a data byte which indicates to the calculator the status of the selected device.

In accordance with the present invention, all interface units are organized in the same way for two-way communication with the calculator irrespective of the nature of the peripheral device. Consequently, the interface unit 19 for the typewriter 18 will now be described with reference to FIG. 2 as exemplary of interface units for all types of devices.

Communications between the calculator and the selected peripheral device takes place through an 8-bit index register in the calculator. (The memory of the calculator is organized in such a way as to be operated primarily in 64-bit words and 8-bit bytes). More specifically, all data transferred from the computer to the selected interface unit and peripheral device takes place in the form of 8-bit bytes transmitted serially through a terminal 30 into an 8-bit control register 31 under control of a clock signal $\phi 2$ applied to a terminal 32. All data transferred from the peripheral device to the calculator is through an output terminal 33 connected to three control gates, namely AND gates 34, 35 and 36 by an OR gate 37.

The gate 34 is enabled only during transfer of data to the calculator from the peripheral device under control of mode control signals applied to terminals 41 and 42. When the IU is responding to a "read status" control code in the register 31, the gate 35 is enabled. At this time, the mode control signals at terminals 41 and 42 indicate neither a data transfer from the peripheral device to the computer nor a control byte transfer from the calculator to the addressed IU. The control code for read status is entered into the register 31 through the terminal 30 while the mode control signals at terminals 41 and 42 indicate a control signal transfer of a byte from the input/output register (index register) of the calculator to the IU. Thereafter, the contents of a status register 45 are read out serially through the gate 35.

The gate 36 is enabled for transfer of entries from a keyboard 44 into the calculator. Each keyboard entry is under control of the calculator through the control register 31 which receives a read keyboard control code. That occurs in response to an I/O request (IOR) signal from a terminal 43 initiated by operation of a key on the keyboard 44 of the input/output unit and stored in both a flip-flop $FF_1$ and the status register 45. Once an I/O request signal is initiated in any one of the IUs, the calculator starts polling the IUs to determine which has initiated the I/O request by reading out the status register of each IU in sequence starting with the IU having the highest address code assigned to it. When it finds the IU having an I/O request stored in its status register, it reads into the calculator, through the gate 36, the address code of that IU and a 4-bit code defining the control key depressed by the operator, i.e. a 4-bit code indicating the function called for. The signal that enables the gate 36 to read out the device and key codes also resets the flip-flop $FF_1$.

When an IU is addressed to transfer data from its associated device to the calculator, the IU responds to control codes transferred to it through the control register 31. Once the device has responded and the data is available in its buffer register for transfer to the calculator, and "interrupt 2" (INT2) signal is generated by the interface unit at a terminal 46. These terminals 30, 32, 33, 41, 42, 43 and 46 are the main terminals of the interface unit to be connected to the junction box 14 through the cable 20 and the single receptacle 17. The corresponding terminals on a terminal strip 50 in the junction box are identified in FIG. 3 by the same reference numerals, but distinguished by the subscript I a.

Figure 3:
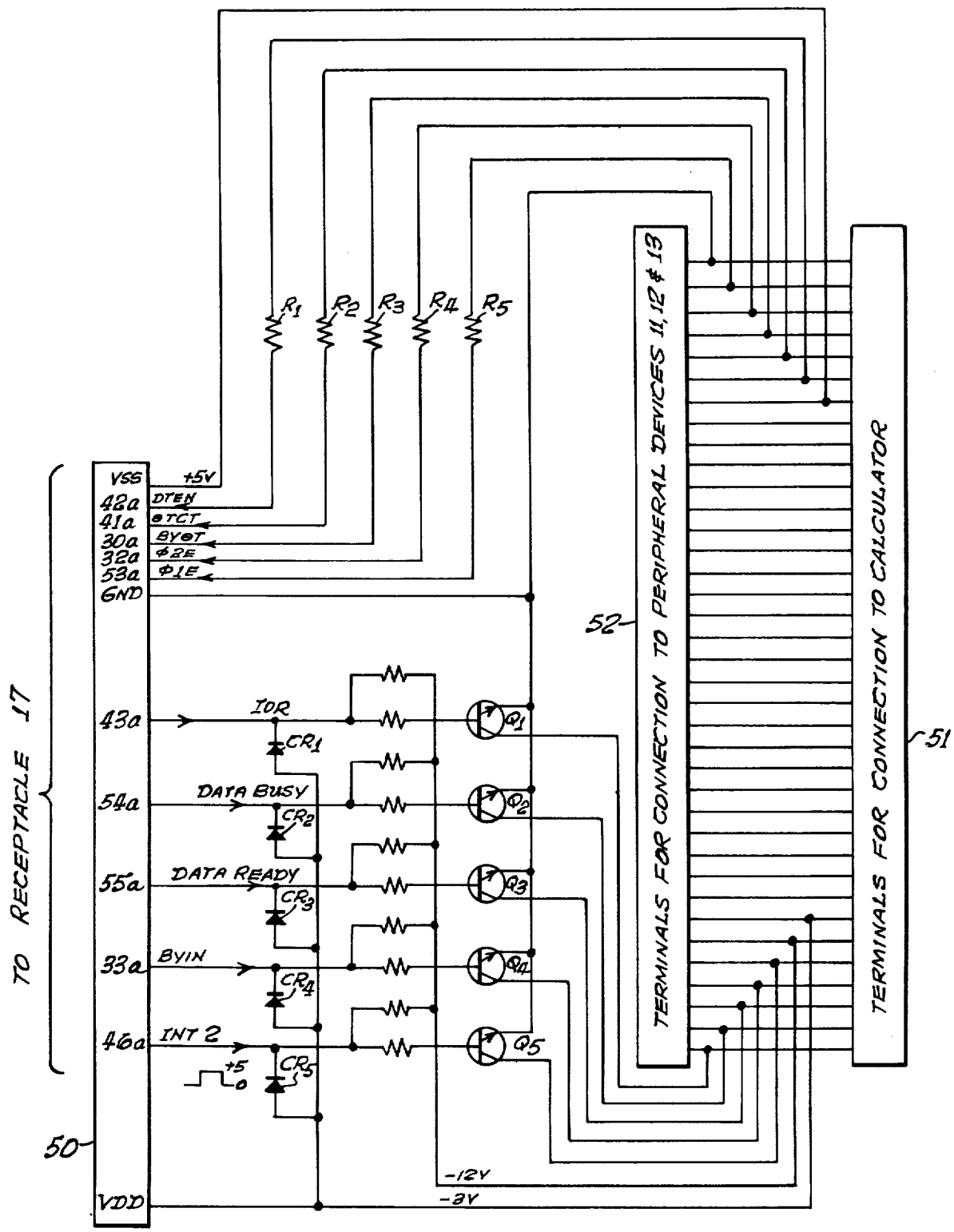
FIG. 3 is a schematic diagram illustrating the junction box shown in FIG. 1.

Additional terminals are provided in the junction box for connection to IUs through cables to supply power, namely $V_{DD}$, circuit ground (GND), and $V_{SS}$ in the terminal strip 50 shown in FIG. 3 to which the receptacle 17 is connected. A terminal strip 51 is connected to the terminal strip 50 and to the calculator 10 (FIG. 1). A third terminal strip 52 is connected to the terminal strips 50 and 51 as shown for direct connection of the other peripheral devices 11, 12 and 13 (FIG. 1).

In addition to the signals at terminal 30, 32, 41, and 42 from the calculator and the power supply terminals, there is an additional signal, a clock signal $\phi1$, at a terminal 53 from the calculator which may be used in the logic networks of the IUs and device control networks wherever a two-phase clock is desired to simplify the logic design of the functions required of the associated peripheral device. The two-phase clocks are shown in the first two waveforms of FIG. 4.

In addition to signals transmitted to the calculator from any IU through terminals $33_a$, $43_a$, and $46_a$, there is provision for the IUs to transmit a "data busy" signal through a terminal $54_a$ and a "data ready" signal through a terminal $55_a$. These two terminals $54_a$ and $55_a$ are not connected in the IU of a typewriter or teletypewriter since transfer of data is under more strict control of the calculator than is otherwise the case in other peripheral devices, such as a magnetic tape cassette device. However, separate wires for those signals must still be provided in cables connected to the IUs of typewriters and teletypewriters to feed the data busy and data ready signals through to an IU of a cassette.

An example of how those data busy and data ready signals may be used is as follows. For the example, assume a magnetic tape cassette device set into a read data mode of operation in order to transfer data to the calculator from the cassette. When the block of data is found, data is read from the tape serially by bit and assembled in the first of two buffer registers. After assembling an 8-bit byte the data is transferred in parallel to the second data buffer and the data ready signal is activated. The data ready signal is used in an analogous way while transferring data to the IU for recording in the cassette through the two buffers. When the second buffer of the tape cassette device has been loaded and the first buffer is empty, the IU activates the signal data ready to indicate to the calculator that it is ready to accept another data byte. In either read or write mode, the IU of the cassette device initates a data busy signal once it has been addressed to indicate to the calculator that the peripheral device is not available.

One of the features of this arrangement for connecting an interface unit through the terminal strip 50 to the terminal strip 51 is that all lines from the terminal strip 50 to the strip 51 are through buffer amplifiers $Q_1$ through $Q_5$, and all lines from the terminal strip 51 to the strip 50 are through small series resistors $R_1$ through $R_5$. Since connecting cables in series places an indeterminate number of IUs in parallel, it is not practical to put terminating resistors on the ends of the long lines connected to the last device IU. Therefore, to minimize the amount of reflections in the lines to the IUs, the small series resistors are employed in the junction box to slow the rise times of the signals. Conversely, the buffer amplifiers employed to couple the terminal strip 50 to the terminal strips 51 and 52 speed up the data pulses to the calculator by increasing the voltage swing (0 to +5V) signals from the IUs to +5V to −12V. Clamping diodes $C_{R1}$ through $C_{R5}$ limit negative excursions of the signals at the outputs of the IUs to help speed up the output of the transistors, i.e., to limit any negative transients in the +5V to 0V transistors in the output signals of the IUs.

Figure 2:
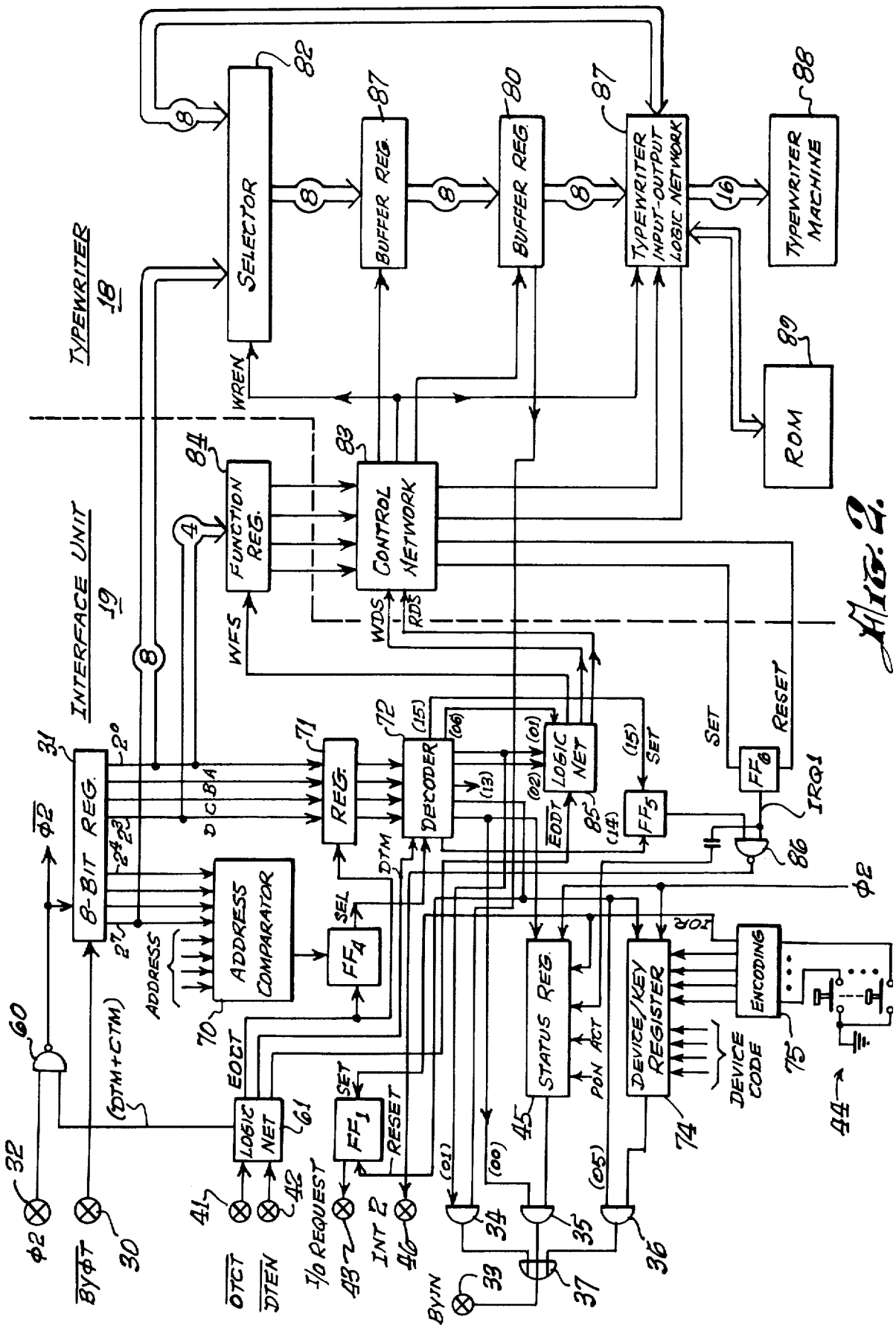
FIG. 2 is a functional block diagram of an interface unit for a typewriter as an exemplary peripheral device.
Figure 4:
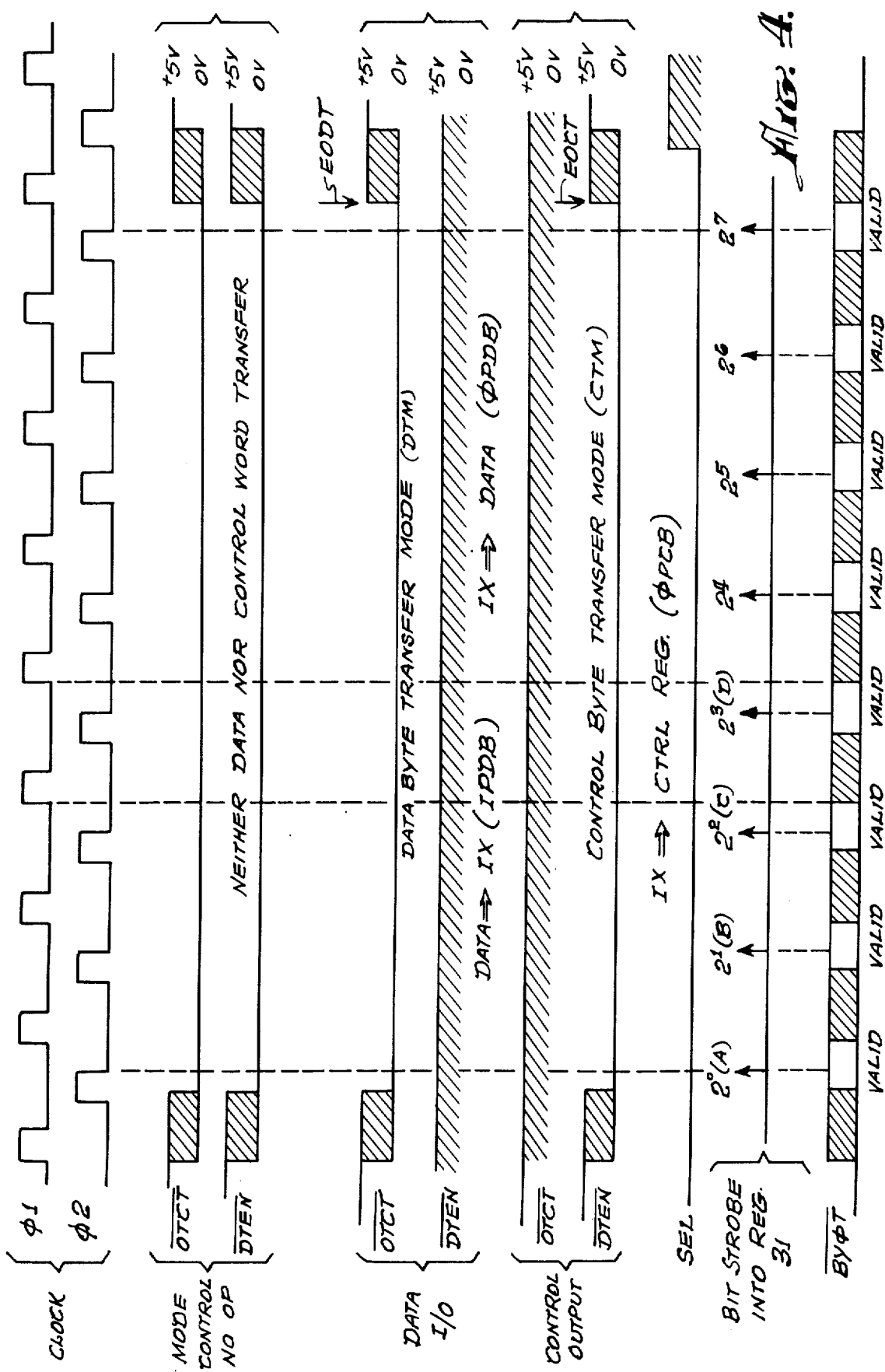
FIG. 4 is a timing waveform diagram of signals transmitted by the calculator of FIG. 1 to the interface unit of FIG. 2 via the junction box of FIG. 3.

Communication between the calculator and the IU of a peripheral device is achieved by way of four signals: a clock signal, $\phi2$; the output signals from the calculator, $\overline{BYOT}$; and to timing signals, $\overline{OTCT}$ and $\overline{DTEN}$. The two timing signals are utilized in a unique way in that they not only control the basic mode of operation for the interface unit, but also provide the timing as to when data is to be transmitted to or from the input/output (IX) register of the calculator. FIG. 4 illustrates in a timing diagram the three basic modes of operation under control of the signals $\overline{OTCT}$ and $\overline{DTEN}$. The first set of waveforms show both the mode control signals $\overline{OTCT}$ and $\overline{DTEN}$ positive (+5V) until the beginning of an 8-bit clocking period, at which time both are false (OV). When both are false, neither a data word nor a control word is to be transferred to or from the calculator. When only the mode control signal $\overline{OTCT}$ drops, as illustrated by the second set of waveforms for the $\overline{OTCT}$ and $\overline{DTEN}$ signals, the mode of operation for the interface units is for a data transfer, either to or from the input/output register of the calculator. The third set of waveforms for the control signals $\overline{OTCT}$ and $\overline{DTEN}$ is the alternate condition in which only the signal $\overline{DTEN}$ drops to indicate that a control word is to be transferred from the input/output register of the calculator into the master control register 31 (FIG. 2).

During the eight bit times that one or the other of the mode control signals is true (+5V), but not both, the trailing edges of the clock pulses ½2 strobe enabled shift registers. For example, to enter a control word into the register 31, the clock pulses $\phi 1$ sequentially prepare the bits for transfer in the calculator (i.e., shift the next bit to be transferred to the output stage of the input/output register) so that at the end of the clock pulses $\phi 2$, the data bits of the signal $\overline{BYOT}$ presented serially to the master control register are valid. Consequently, the clock pulse $\phi 2$ is applied to the master control register 31 to shift the control word in. The clock pulse $\phi 2$ is gated to the register 31 during this 8-bit clock period through a NAND gate 60 enabled by a mode control network 61 which decodes the mode control signals $\overline{OTCT}$ and $\overline{DTEN}$ received through the terminals 41 and 42 and produces a signal (DTM+CTM) when either a data transfer mode (DTM) or a control transfer mode (CTM) is indicated by the mode control signals $\overline{OTCT}$ and $\overline{DTEN}$.

Figure 5:
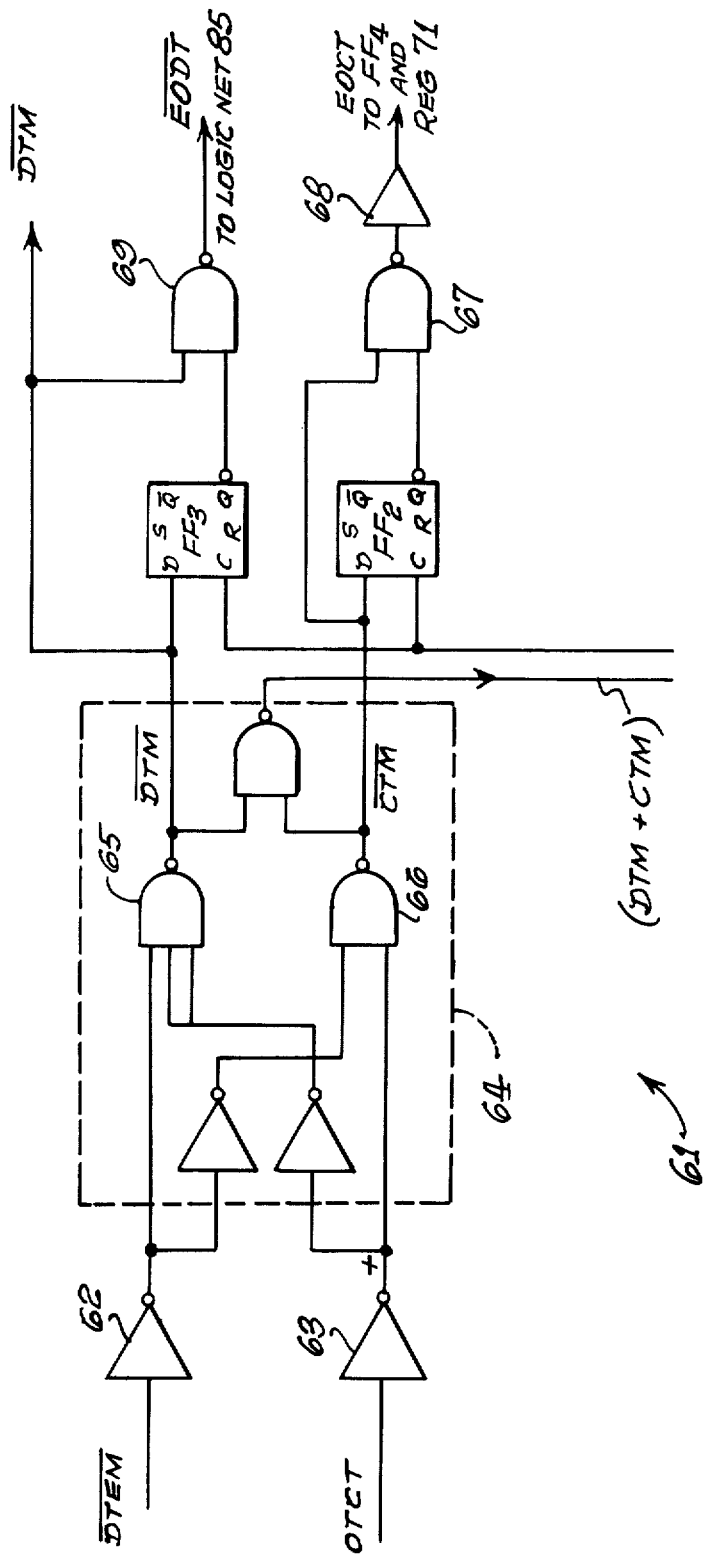
FIG. 5 is a logic diagram for the mode-control network shown in FIG. 2.

The logic network 61 is shown in FIG. 5. A pair of inverters 62 and 63 apply the mode control signals OTCT and DTEN to an Exclusive OR network 64 which provides the signal (DTM+CTM) to the gate 60 when either mode control signal is true, but not both. NAND gates 65 and 66 in the Exclusive OR network 64 decode the mode control signals to determine whether the operation to follow is to transfer a control word from the calculator to the interface unit, in which case NAND gate 66 causes a flip-flop FF$_2$ to be set, or to transfer data to or from the calculator, in which case the NAND gate 65 causes the flip-flop FF$_3$ to be set. If the flip-flop FF$_2$ is set, a NAND gate 67 causes a signal EOCT to be transmitted by an inverter 68 to cause a D-type flip-flop FF$_4$ (FIG. 2) to be set at the end of control transfer time, but only if a comparator 70 determines that this device is being addressed. To accomplish that, the address of this device is set (hard-wired) at address input terminals of the address comparator 70. If the flip-flop FF$_3$ is set, a NAND gate 69 transmits a signal $\overline{EODT}$ which signifies the end of data transfer time.

It should be noted that the master control register 31 of every interface unit is connected to receive computer output $\overline{BYOT}$ and gated clock pulses $\phi 2$. Consequently, every time a data byte or a control byte is put out from the calculator, it is entered into the master control register in all interface units. If the byte is a control byte, the flip-flop FF$_2$ (FIG. 5) is set during the eight clock periods shown in FIG. 4, and is thereafter immediately reset by the next clock pulse $\phi 2$. If at that time the address comparator transmits a true signal, the flip-flop FF$_4$ is set as just noted above. That flip-flop remains set to transmit a select signal, SEL, until another control word is transmitted by the calculator to select another peripheral device, at which time the flip-flop FF$_4$ is reset and the corresponding flip-flop in the interface unit of that other peripheral device is set. In that manner the interface units of all peripheral devices assure that only one peripheral device is selected at any one time for the purpose of transferring data to or from the device.

At the same time that flip-flop FF$_4$ is being set, the four least significant bits in the master control register 31 are strobed by the signal EOCT into a 4bit register 71. These four bits are mode control bits in the 8-bit control byte just shifted into the register 31. The control bits are transferred to this register in every IU, but are only decoded by a decoder 72 in the IU of the selected device enabled by the signal SEL from the flip-flop FF$_4$.

The output of the decoder 72 in the selected interface unit controls which way data will go, whether it will go from the computer through the terminal 30 and the master control register 31 to the peripheral device, or from the peripheral device through the terminal 33 via the control OR gate 37. Other possibilities are to read into the calculator the status of the interface unit from the 4-bit status register 45 via the gate 35, or the content of an 8-bit device/key register 74 via the gate 36. The octal codes decoded by the decoder 72 for the typewriter interface unit are as follows:

00 - Read status register
01 - Read data into CPU
02 - Write data into device
05 - Read device/key register
06 - Load output data byte into function register
13 - Restore (reset interface units)
14 - INT2 disable
15 - INT2 enable Those codes having a one in the most significant octal digit position (a bit 1 in the most significant bit position of the four bits being decoded) are address independent, and the action indicated takes effect in all interface units, such as to restore (reset) all interface units in response to the octal code 13. The octal code 13 is put out whenever a reset key in the calculator is actuated or a reset is otherwise initiated by the calculator. The octal code 14 permit disabling the interrupts from all interface units in order to, for example, permit the calculator to complete some task without interruption. The octal code 15 will then enable the interrupts to again be effective. Implementation of this control is illustrated in FIG. 2 by a flip-flop FF$_5$ which is reset by a code 14 and set by a code 15. Implementation of the reset code 13 is indicated generally in FIG. 2 by a decoded output (13) which is applied throughout the interface unit to reset flip-flops and registers are required.

The control codes having an octal zero in the most significant digit position are address dependent such that the select signal, SEL, must be true in order for the mode control to take effect. The "read status" code 00 puts the interface unit in the read status mode by enabling the gate 35. No other preparation is necessary to read the status, but the status is not read until the next control word from the calculator into the master control register signifies that an 8-bit byte is to be read into the calculator. Once that occurs, clock pulses $\phi 2$ shift the contents of the status register out through the gate 35 into the calculator. The contents of the status register included whether or not power is on in the peripheral device (PON), whether or not an input/output request has been initiated by an IOR signal from an encoding unit 75 connected to the keyboard 44 of the interface unit, and the status of two other conditions, namely IRQ1 to indicate whether or not there has been an INT2 initiated and ACT to indicate whether or not the device is running or busy. While the control code 00 is present, the status register will shift in zeros as the status is shifted out through the gate 35, thus emptying the status register. Once the control code 00 is no longer present, i.e., once some other control code has been shifted into the register 71, each of the stages of the status register is again set by the respective status input signal still present. In other words, the status register input signals are continually strobed in by $\phi 2$ clock pulses, except while reading out.

If the control code in the register 71 is an octal 01 for a read data mode, the 01 code signal which enables the gate 34 also enables the contents of an 8-bit buffer register 80 of typewriter 18 to be shifted out to the calculator in response to clock signals $\phi 2$, but not until other preparations are made to load a buffer register 81 via selector logic 82 with the 8-bit byte to be read out, and to transfer the contents of the register 81 into the register 80, all under control of a control network 83 in response to a control byte entered into the IU through the master control register 31 and stored in a function register 84. Operation of both the control network 83 and the function register 84 is under control of a logic network 85 connected to the decoder 72 and the logic network 61.

The logic network 85 is provided to gate control signals to the control network 83 and the function register 84 for carrying out the operations called for by octal codes decoded by the decoder 72 which involve the peripheral device, namely the codes 01, 02 and 06. The first two codes call for a data byte transfer to and from the calculator, and the third calls for loading the function register with a code which sets up the operating state of the control network 83. The operating states for a typewriter may be simply as follows:

| BIT | HIGH (1) | LOW (0) |
| --- | --- | --- |
| A | WRITE ENABLE | READ ENABLE |
| B | ENABLE INT2 | DISABLE INT2 |
| C | (Not Used) | |
| D | TYPE LAMP ON | TYPE LAMP OFF |

WRITE ENABLE allows printing under calculator control and is used in conjunction with a mode-02 code in the register 71. The READ ENABLE is used in conjunction with a mode-01 code in the register 71. The TYPE LAMP ON control may be set to indicate when the typewriter is under calculator control so the operator does not attempt to use it to enter data into the system. It could, of course, be used the other way to indicate when the typewriter is available to the operator. The ENABLE and DISABLE INT2 function merely permits selective control over the ability of this device to interrupt the calculator. Recall that the general INT2 disable and enable modes (14 and 15) are address independent and affect all IUs alike. From the foregoing it may be appreciated that for a typewriter, the function control may consist of merely setting the control network 83 to one of two states, a write state to print under calculator control, and a read state to transfer data entered through the typewriter key board to the calculator.

Actual loading of the buffer registers 81 and 80 is under control of the calculator program called in by an INT2 signal. The control is exercised through the network 83 which receives the programmed function control bits via the register 84, which in turn is loaded through the master control register 31. When a data byte has been loaded into the buffer register 80, the control network sets a flip-flop $FF_6$ to initiate an interrupt request signal IRQ1 which, if gate 86 is enabled under the programmed control of octal code 15, is transmitted by the gate as an interrupt signal INT2. The signal IRQ1 is entered into the status register 45 regardless of whether interrupt is enabled. As noted hereinbefore, the code 15 is address independent and is used to enable all IUs until the stored program reaches a point where it is not to be interrupted and so puts out a code 14 control byte. Later the calculator restores the IUs ability to interrupt the program by putting out the code 15. A write data code 02 is similar to a read data code 01. Once the flip-flop $FF_4$ is set and the logic network 85 is set to enable a function code to be entered into the register 84 from a subsequent control byte, the selector 82 is enabled by the control network 83 to load the buffer register 81 with a data byte entered by the computer through the master control register 31. The control network 83 is also used to control input data to the typewriter machine 88 through an input/output logic network 87. When the typewriter has a byte in the register 80 ready to be accepted into the logic network 87, the control network 83 sets the flip-flop $FF_6$ to initiate an interrupt request. The calculator will respond by branching in its program to a subroutine for outputting the next byte into the register 81, and then into the register 80 when the last byte in the register 80 has been used.

There are actually very few calculator instructions that are used for the total communication between the calculator and all peripheral devices. In fact, all communication takes place with four basic instructions, which are as follows:

OPCB - Output control byte
IPDB - Input data byte
OPDB - Output data byte
IRNS - Read input status The simplicity of this arrangement is due in part to the novel feature that all signals required to control a peripheral device are provided by the calculator. Those signals are the mode control signals $\overline{OTCT}$ and $\overline{DTEN}$, timing signals $\phi 1$ and $\phi 2$ (the entire system of calculator and IUs is synchronous) and control bytes transmitted as output bytes $\overline{BYOT}$. Data bytes to the peripheral device are also output bytes $\overline{BYOT}$, and data bytes to the calculator, including the contents of the status register and device/key register are input bytes BYIN.

An instruction OPCB is executed to output a byte containing the address and control octal code to the register 31. The octal code is entered into that register and the register 71 of all IUs, but only the selected one will have its flip-flop $FF_4$ set to enable its decoder. The decoder then decodes the octal code. If the octal code is 01 (read data from peripheral device into calculator) or 02 (write data into device), a function code must first be entered in the function register 84 in response to a calculator instruction OPCB with an octal code 06 (load output data byte into function register). The decoded mode-06 signal from the decoder 72 is applied to the logic network 85 where it is gated out at the end of a following data byte transfer mode by the end of data transfer signal EODT. That following data byte transfer mode is set by an instruction OPDB which transfers the function code in the register 31. The mode-06 signal gated out of the logic network 85 as a signal WFS strobes the function code into the register 84.

If the function code programmed is READ ENABLE, the next instruction in the program is an output control byte OPCB (mode 01) eventually followed by an instruction IPDB to input a data byte. The instruction IPDB is put out by the calculator when the flip-flop $FF_6$ is set by the control network 83 to generate an interrupt INT2. Once the interrupt is serviced by an instruction IPDB, the flip-flop $FF_6$ is reset by the control network 83. The mode-01 signal from the decoder 72 is gated as a signal RDS by the logic network 85 at the end of the data byte transfer mode produced by the instruction IPDB, thus setting up the control network 83 to transfer a data byte from the buffer register 80 to the calculator via enabled gate 34.

If the function code programmed is WRITE ENABLE, the next instruction programmed is an output control byte OPCB (mode 02). The mode-02 signal from the decoder 72 is gated as a signal WDS by the logic network 85 at the end of a following data byte transfer mode produced by an instruction OPDB to output a data byte. That sets up the control network 83 to receive the output data byte then in the register 31 through the selector 82 and buffer registers 81 and 80 to print a character in the machine 88 through the logic network 87.

The tape cassette 22 shown in FIG. 1 is, of course, distinct from both the typewriter and the teletypewriter. Consequently, in the case of a tape cassette, and any other device not like a typewriter, the control network 83 and input/output buffer arrangement will be uniquely adapted to the device. However, the organization of its IU would be the same as the IU shown in FIG. 2 for the typewriter, except that the cassette IU would transmit the data busy and data ready signals referred to hereinbefore with reference to FIG. 3. from the cassette control network 83. The typewriter and teletypewriter IUs include lines in their cables for those signals even though not used by the typewriter and teletypewriter so that those signals can be passed along the series connected cables regardless of where the cassette is placed in the chain of linked devices.

A code 05 to read the device/key register 74 is similar to a read status code 00. The decoder 72 puts the interface unit in the read device/key mode by enabling the gate 36. No other preparation is necessary. The decoder output (code 05) enables the gate 36 and enables the device/key register to respond to the gated clock pulses $\phi 2$. The four least significant bits shifted out first define the IU control key depressed by the operator, and the four most significant bits define the type of device connected to the IU, such as the code 0010 for the typewriter in the illustrated example. The IU typewriter control keys include the following:

| CODE | KEY |
|---|---|
| 0001 | Load from typewriter |
| 0010 | Print on typewriter |
| 0100 | Start field |
| 0101 | End field |
| 0111 | Fill spaces to end of field |
| 1000 | End loading from typewriter |
| 1001 | Backout one character |
| 1010 | Print entry register |
| 1011 | Wait |
| 1101 | Pack (Convert ASCII to BCD) |

-continued

| CODE | KEY |
|---|---|
| 1110 | Unpack (Convert BCD to ASCII) |
| 1111 | Output n spaces |

The manner in which these keys are used is not a part of this invention. It is only the fact that the IU does give the operator some control over the device through the keyboard 44 that is part of this invention, particularly since each different type of device will have its own keyboard control unique for its purpose. When a control key (as distinguished from a typewriter keyboard key) is depressed:

1. the code corresponding to this key is stored in the four lower bits of the Device/Key Register,
2. the I/O, request line to the calculator is activated, and
3. the requesting service bit of the status register is also activated. The calculator looks at the I/O request line when in the idle loop and also when executing a calculator key instruction from the calculator memory. When an I/O request is found to be active, the calculator polls the status reqister of the attached peripherals to determine which device requires servicing. Upon finding the device requiring service the calculator addresses the IU and places it in the mode to read the device/key register (code 05). When the IU is in that mode, the next input data byte instruction causes the IU to transmit the data byte stored in the device/key register into the calculator. Serially shifting the contents of the register into the calculator causes the register to be reset by trailing zeroes being shifted in. When a key is again depressed, the device code is again strobed in at the same time the key code is strobed in by a $\phi 2$ clock pulse. In other words, depressing any key enables the register to be loaded.

A code 06 is used to prepare the IU to receive an output data byte into the function register 84, via the master control register 31, following an output control byte. Such an output data byte consists of a function code which sets up the operating states of the peripheral device, the typewriter 18 in the illustrated example. The controlled operating states for the typewriter are:

| BIT | TRUE (+ 5V) | FALSE (0V) |
|---|---|---|
| A | Write Enable (Print under calculator control) | Read Enable |
| B | Enable INT2 | Disable INT2 |
| C | (not used) | |
| D | Type lamp on (Typewriter keyboard active) | Type lamp off |

The calculator sets the operating state by addressing the interface via an output control byte and placing it in the write function mode. The next output data byte is accepted by the interface and stored in the function register. Thus, the typewriter is activated, or deactivated, and selected for inputting or outputting characters.

The foregoing table of operation codes for the typewriter shows that only three bits A, B and D are needed to control the typewriter states. For other devices, such as the tape cassette, more states may be required for control, in which case bit C is also used. If necessary, bits reserved for the device address in an addressed byte may also be used for control because those bits are not used in the 8-bit byte which transmits the operation code to the function register. Recall that the IU is first selected and placed in the mode 06 status by an address byte before an output data byte is put out by the calculator to the function register.

Once the device/key register has been read into the calculator, the calculator decodes the device code, and decodes the key code for the indicated type of device to determine what action to take. For example, if the device is a tape cassette, rather than a typewriter, and the key depressed is a rewind key, the calculator determines that and puts out a rewind control byte to the IU found to have initiated an I/O request. The sequence is to select the IU by issuing a byte of eight bits containing the address of the device and the code for the function mode (06). Then a function control byte is transmitted by the calculator and accepted by the selected IU. Once entered into the function register, the code for the rewind function is decoded to initiate the rewind operation in the cassette.

The calculator decodes the content of the device/key register read using any suitable decoding means. A preferred means is a read only memory (ROM) into which tables of key codes have been stored for each type of device. The ROM is addressed by the device code and the key code, and the output of the ROM is a unique code which indicates the function control byte to be put out. If a type of device not provided for in the ROM is connected, such as between the cassette 22 and teletypewriter 26, the code specifying the other type of device would not be capable of addressing the ROM. As a consequence, the code read out would be zero, but that zero code could indicate to the calculator, that the calculator should look to a table at a predetermined memory location in a random-access-memory (RAM). A code is then read from the RAM specifying the function to be carried out. That technique permits the number of different types of devices from which the other device is selected to be indeterminate, but only "other" devices of the same type can be used at any one time. If changed, the table for converting key codes to function codes must be changed by the operator of the calculator.

The manner in which the network 87 is implemented depends upon how the electromechanical controls of the typewriter machine are mechanized, and whether or not the typewrite machine can respond to the calculator printing and nonprinting control codes. For example, assuming an ASCII code for both the data put out by the calculator and the data into an IBM Selectric typewriter, the data to be printed must be converted from the ASCII code to the Selectric code. For data transfer in the opposite direction, the data manually entered at the typewriter keyboard must be converted from the Selectric code to the ASCII code for transmittal to the calculator via the selector 82 and gate 34. That is accomplished by a code converting function of the network 87. To facilitate the code conversion function, a read only memory (ROM) 89 is provided to store in tables the two sets of codes. Code conversion in either direction is then carried out by table-look-up techniques, i.e., by using a byte in one code to address the ROM for the corresponding code in the outer code, depending on which direction data is being transferred. The ROM could be two diode matrices, one for each direction of data transfer. The advantage of using a ROM for code conversion is the ease with which it can be adapted for the particular typewriter. This is important for meeting the needs of foreign markets.

To summarize the use and operation of the IUs, input and output of data is controlled by the master control register 31 and the function register 81. The register 32 receives all output control bytes used to set the mode of operation of the IU addressed, and to receive an output data byte for entry into the function register 84 when it follows a mode-06 output control byte, and for entry into the buffer register of the device when it follows a mode-02 output control byte. If data is to be transferred into the calculator, a mode-00 output control byte is put out by the calculator after an INT2 signal has caused the device having data in its buffer register to be located. This assumes the function register has been loaded with a read-enable function code using an output control byte and an output data byte set of instruction bytes. The status register is then read into the calculator which responds with a pair of instruction bytes (mode-01 output control byte and a "read" output data byte). The combination of an output control byte and an output data byte will cause an input data byte to be read into the calculator when the output control byte is mode-00 to read status and mode-01 to read data. The mode-00 is initiated by the calculator in response to an INT2 signal and the mode-01 is initiated by the calculator in response to the status read.

Inputting from the IU keyboard is similar to inputting data. An I/O request causes the calculator to determine which IU has had a key depressed. When found, the calculator outputs a mode-00 output control byte to read the status register, and a mode-05 output control byte is then initiated by the calculator in response to the status read. A mode-05 output control byte is followed by an output data byte with a read function code. That combination of an output control byte and an output byte will cause the input data byte to be read into the calculator from the device/key register.

To output data, the output control byte and output data byte pairs of instruction bytes are a mode-02 and a write function respectively. The next output data byte is then the data byte to be put out. An INT2 signals when another data byte is needed which causes a mode-00 output control byte and a read-function output data byte to be issued for reading the status register. The calculator is in a data output loop, and not a data input loop, so the calculator loop program directs that the next pair of output control byte and output data byte, instruction bytes be a mode-02 and a write-function, respectively. Then the next output data byte is data.

This arrangement for an IU places more hardware in the IU, and requires more program instructions for each input or output data byte handled (to control mode and function), but has the distinct advantage of permitting an indeterminate number of IUs for different types of mixed devices to be connected to the calculator through a single receptacle in a junction box. That is particularly advantageous to a small user who may from time to time need to add peripheral devices to meet growing needs. It also permits the operator to control the peripheral devices through keyboards on the IUs.

The interface unit 23 for the tape cassette 22 shown in FIG. 1 will now be described with reference to FIGS. 6 through 16 with emphasis on that which is distinct from the interface unit for a typewriter or teletypewriter. But first it should be noted that while only one cassette unit is shown, in practice several may be included in a system that employs the aforesaid 400 series calculator as the CPU.

Each cassette IU will accept data ($\overline{\text{BYOT}}$) in 8-bit bytes for recording on tape, and will transfer data ($\overline{\text{BYIN}}$) to the CPU in 8-bit bytes. The data ($\overline{\text{BYOT}}$ and $\overline{\text{BYIN}}$) channels are as described with reference to FIG. 2 for the typewriter IU. Data is recorded on, or read from, the tape in a serial phase-encoded bit stream (800 bits per inch) at a rate of 6 inches per second.

The CPU is capable of operating (transferring $\overline{\text{BYOT}}$ and $\overline{\text{BYIN}}$ data) to and from only one cassette at a time, but is capable of setting one or more cassette IUs in a rewind or search mode. This limitation on data transfer operations is due to the high rate (4,800 bits per second) of the tape cassette.

In the read mode, the CPU must continually monitor the data ready signal at terminal 55a (FIG. 3) once data transfer is initiated. The continual monitoring is carried out by executing an appropriate test and branch instruction in a tight program loop. When data is ready in an output buffer register, the data is transferred to the CPU by executing an input data byte (IPDB) instruction. The data ready signal is immediately cleared after the transfer by the IU.

Befoe data is read, the tape is positioned immediately in front of the record to be read under control of the CPU. This is accomplished by searching forward or backward, or by having just read or written the previous record. In the case of the first record, this could be accomplished by having just completed a rewind. The CPU then places the interface in the read mode.

Once the IU is in the read mode, the CPU activates the run control function of the IU to start the tape mechanism in the forward direction at the normal speed (6 IPS) for reading and writing. When the IU has accepted a run command, it transmits a data busy signal to terminal 54a (FIG. 3). The CPU detects the data busy signal by an appropriate test and branch instruction and begins monitoring the data ready signal on terminal 55a (FIG. 3).

Data is read from the tape serially by bit and assembled into 8-bit bytes in data buffer registers. After assembly, each 8-bit byte is transferred from the first to the second data buffer register in parallel. The data ready signal is then activated. While the next 8-bit byte is being assembled in the first data buffer register, the content of the second data buffer register is read out serially as data ($\overline{\text{BYIN}}$).

Operation in the write mode is similar. Once the IU signifies that it has accepted a command to run and transmits a data busy signal to terminal 55a, the CPU detects the data busy signal by an appropriate test and branch instruction and begins monitoring the data ready signal (FIG. 3). Immediately after activation, the IU starts the tape and writes a record gap by efffectively writing a continuous bit zero. The IU also activates the data ready signal at that time to signify it is ready to accept data from the CPU. Each time the data ready signal is detected, the CPU transfers a data byte to a first data buffer register in the IU. At the same time, the data ready signal is cleared. Once the data byte just entered into the first data buffer register of the cassette IU is transferred to a second data buffer, the data ready signal is again set to call for the next data byte. Thus the data to be recorded is effectively double buffered but, as will be noted more fully hereinafter, the same double buffering arrangement is not used for both read and write. As the data byte is serially transferred to the tape from the second buffer register, a new data byte is being entered into the first buffer register.

Figure 6:
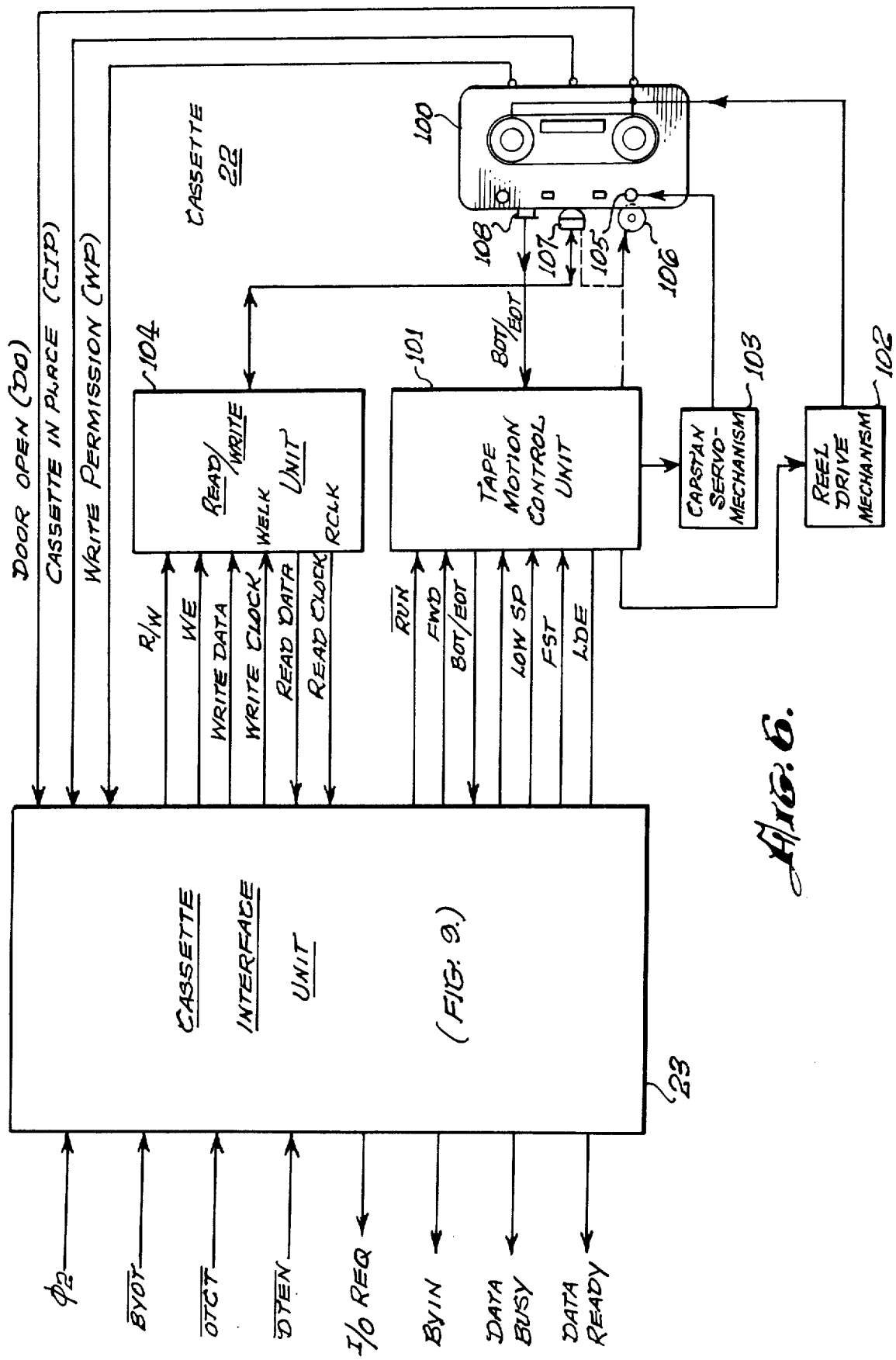
FIG. 6 is a functional block diagram of an interface unit for cassette magnetic tape storage.

Before proceeding with a more detailed description of the cassette IU, the cassette itself, and its tape motion and read/write control units, will first be described with reference to FIG. 6. The term "cassette" has thus far been used to refer to the entire digital tape transport mechanism which utilizes magnetic tape stored on a supply reel and transferred to a takeup reel during a read or write mode of operation. The reels and tape are contained within a magazine for easy loading and permanent storage of the tape. The magazine is commonly called a cassette. Consequently, the term magazine is used in the following description of FIG. 6 to refer to that which is otherwise called a cassette. The cassette 22 (FIG. 1) therefore consists of a magazine 100, tape motion control unit 101, reel drive mechanism 102, capstan servo mechanism 103, read/write unit 104 and other related elements.

The magazine 100 is of the conventional Philips type made with sufficient precision for operation in a transport mechanism shown schematically. The tape transport mechanism is comprised of a single servo-controlled direct drive capstan 105 for precise tape velocity control, and individual reel motors in the mechanism 102 for tape tension control.

While reading or writing, the tape is held in non-slip contact with the capstan by a pressure roller 106. Tape velocity is servo controlled through the capstan to a precise ramp while starting, and while stopping. During reading or writing, the tape velocity is maintained at a constant value of 6 IPS. Motor torques for the supply and takeup reels are appropriately and individually programmed for the operating mode by the tape motion control unit 101 through the reel drive mechanism 102. The tape motion control unit also controls the capstan servo mechanism 103. Programming the tape motion control unit is a matter of logic control responsive to input signals from the cassette IU. That logic control is commercially available as an integral part of the cassette drive mechanism, such as the Interdyne Cassette Drive, model number IC 2500.

Data can be synchronously written and read at rates up to 16,000 bits per second through the read/write unit 104, which is a rate significantly greater than the read and write data rates required for operation of the tape at 6 IPS during read and write modes.

Input data to the read/write unit 104 is accepted serially for recording on the tape as a binary logic level (high=1, low=0) plus a clock. A write amplifier combines the data with the clock and produces a phase encoded pulse train to a magnetic head 106 used for both reading and writing. While reading, the signal from the head is processed by the read/write unit 104 to produce a data output signal as a logic level and a separate read clock. The data is reproduced through a read amplifier which utilizes level discrimination to produce the logic level and the separate clocks.

FIG. 7 shows in waveforms A through G the timing of the write signals for a byte to be recorded. The write data into the unit 104 is shown to be changing logic levels at trailing edges of accompanying write clock pulses, one clock pulse for each bit time. The write clock pulses are delayed internally by the unit 104 in order that a logic circuit may respond to the delayed write clock pulses to reverse the head current polarity which is normally at a bit-0 polarity used to erase the tape. At the beginning of each bit time, the current is returned to the bit-0 polarity unless the data level is high for a bit 1. In that manner, the head current switches in polarity at the middle of each bit time from the bit-0 to the bit-1 polarity for a bit-0, and from the bit-1 to the bit-0 polarity for a bit 1. This is what is referred to as phase encoding of binary data signals. The recorded head current is as shown by waveform G.

To begin a write operation, the tape motion control unit 101 receives a singal $\overline{RUN}$ as shown in waveform A to start tape motion as shown by waveform B, the tape velocity feedback signal. As noted hereinbefore, the tape motion control unit 101 is programmed to provide start and stop times as shown. After the start time has lapsed, a write-enable signal, WE, shown in waveform C is supplied to the unit 104 to permit new data to be recorded in accordance with the write data shown in waveform D. Once these conditions have been met, the write clock shown in waveform E, and the delayed write clock shown in waveform F, synchronize logic in the unit 104 to control the head current. Once the write/enable signal is returned to the logic 0 level, current to the recording head is shut off.

Waveforms H and I illustrate the timing of the read data and clock pulses produced by the read/write unit from the data recorded by the head current shown in waveform G during a read mode.

The following conditions prevail during a write operation. With the write enable signal high, the input write data is encoded, but only as long as the write clock is present. The start of a bit cell occurs when the write clock goes from a high to a low level. The width of the clock pulse itself is less than ten percent of the bit cell. The read/write unit delays the write clock internally for approximately five microseconds to insure that the write data is strobed well within the first half of a bit cell. As the write data is strobed by the delayed clock, write circuits in unit 104 reverses current at the center of the bit cell to that opposite the polarity used to erase, or record a gap, thus recording a phase encoded zero. A 1 to be recorded is phase encoded oppositely as a current reversal at the center of the bit cell to the polarity used for erasing, or recording a gap. The head current always returns to the erase polarity when the write enable signal, WE, is low irrespective of the write data and the write clock.

The read circuit in the unit 104 is always energized irrespective of the read/write signal R/W. However, the read data is obtained by the cassette interface unit from the read/write unit 104 only when the interface unit is in the read mode. While in the write mode, the read data out and read clock from the unit 104 is not valid since the write data is then being picked up directly in the read circuit which will saturate the read amplifier and produce invalid data. The valid read data from the unit 104 during a read mode is in the same format as the write data with the timing as shown in FIG. 7. The following condition prevails on the read data and read clock signal lines. The read clock occurs approximately ¾ of a bit cell after the start of a bit cell, and each read clock pulse is approximately eight microseconds. The write time of a read clock pulse is approximately four microseconds while the write time of the read data signal is approximately three microseconds.

In normal operation, a single byte of data is not stored by itself. Instead, data is stored on the tape in blocks as records, each block consisting of a preamble, a check character a record number, the number of bytes in the record, and the record itself as shown in FIG. 8. Each record thus stored is preceded by a record gap (approximately 1 inch of tape) and is followed by another record gap of the same length. In that manner, two succeeding records are separated by about two inches of inter-record gap. An inter-record gap is recognized by the absence of flux transitions. The start of a record is then identified by detecting a preamble of 10101010 (252 octal) immediately following an inter-record gap. Following the preamble is the header information consisting of an 8-bit check character, a 12-bit record identification character and a 12-bit character containing the number of bytes in the record for a maximum record size of 4,096 bytes.

The record gap before and after each record block is effectively produced by exhibiting the write-enable signal for one inch of tape before recording the preamble received from the CPU. The balance of the block is then recorded serially, one byte following immediately after another such that as the last bit of one byte is being recorded, a new byte present in the first of two buffer registers, is transferred into the second buffer register.

The 8-bit check character is formed by the CPU prior to calling for the transfer of a record to the cassette. That is accomplished by first forming a 24-bit binary sum of all the bytes which are to be written on the tape, and then adding the 8 least significant bits and the 8 most significant bits to the 8 intermediate bits of the binary sum to form the final 8bit check character.

The record identification number is a binary octal coded number assigned to each record in sequence from $0000_{(8)}$ to $7777_{(8)}$. Records are located on the tape by counting down blocks starting with the first assigned to the octal number 0000. Once the record block is found, the record identification number is used to confirm that the proper record is being read, or rewritten in the case of a block insert operation. The check is performed by the CPU, such as by comparing the record's identification number as read from the tape with the content of the internal register storing the number of the desired record. When the two numbers are the same, the data is used as required. When they are not the same, the CPU initiates another search for the proper record under program control. The program can be so prepared as to cause the CPU to repeat the process three times, and if after the third time the two numbers are still not the same, an error message is printed through the CPU printer (not shown). In addition, a particular error flag is set within the CPU. Since an error flag is set when this type of error occurs, the programmer has the option upon testing this flag after each tape read operation of stopping execution when the error has occurred or allowing normal continuation of the program.

After a record has been found and read, the CPU employs the 8-bit check character to determine whether or not any error has occured in reading the record from the tape. If an error has occurred, the CPU causes the record to be read again under program control. The CPU repeats the process 3 times, and if after the third attempt it is still unsuccessful, an error message is printed on the CPU printer, and a particular flag is set. Here again the programmer tests for the error flag and when an error has occurred, has the option of either stopping execution of the program or allowing normal continuation.

The CPU is programmed to make proper distribution and use of the ten bytes in the record header following the preamble once the cassette IU detects the preamble. The number of bytes in the record is stored by the CPU in a counter which is decreased by one each time an IPDB instruction is executed to input the data bytes into the CPU following the most significant octal digit of the four octal number of bytes in the record. In that manner the CPU can know when it has completed the process of reading a record so it can go on with the next process of the stored program. If that is the last, or the only record to be read, the cassette IU stops the tape. That is accomplished by returning the $\overline{RUN}$ signal shown in waveform A of FIG. 7 to a high (logic 1) level after spacing to the center of an interrecord gap upon detecting the end of data in the record being read.

A low (logic 0) level of the signal $\overline{RUN}$ causes tape motion at a selected speed and in a direction specified by a signal FWD from the cassette IU to the tape motion control unit 101. The FWD signal causes forward motion of the tape when it is at a high (logic 1) level. A low level causes the motion to be in the opposite (reverse) direction. The signal FWD is set to the high or the low level by a programmed function code through the function register of the cassette IU.

Only three tape speeds are employed in this exemplary emobodiment, a low speed (6 IPS) for read/write operations, a high speed (30 IPS) for record search and a fast speed (90 IPS) for rewind. The low and high speeds are set by function codes entered into the function register by which the modes of operation are set up in the cassette IU.

In addition to the control signals applied to the tape motion control unit 101 to determine when it shall run, the direction, and the speed, the tape motion control unit also receives a load enable signal, LDE, which is high (logic 1) to cause the capstan and reels to stop irrespective of the levels of all other interface lines and to disengage the pinch roller 105 and head 107 for removal of the cassette 100. The only output signal from the tape motion and control unit is a signal BOT/-EOT which is at a high level when the tape is fully rewound to place it at the beginning (BOT) or in the other extreme at the end (EOT) as is determined by a photosensor 108 which senses clear leader at the beginning or the end of the tape.

The read/write unit 104 receives from the cassette IU a signal R/W which controls the read/write modes of operation of the cassette. A high (logic 1) level of this signal inhibits the write circuits and enables the read circits to read data off the tape and transmit read data and read clock as shown in waveforms H and I of FIG. 7. A low level (logic 0) of this signal energies the write circuits and allows input data to be written while the write enable signal is present as described hereinbefore with reference to FIG. 7. The write clock, WCLK, is generated by the cassette IU and applied to the read/-write unit 104 to synchronize switching the polarity of the head 107 energized for recording. The only signal out from the read/write unit 104 is read data and read clock. As will be described hereinafter, the cassette IU generates from BOT/EOT on inter-record gap signal, IRG, which is low (logic 0) while the head 107 is reading a record gap. It should be recalled that a gap is recorded by erasing and is accomplished when the write enable signal, WE, is low (logic 0) to cause the head current to remain saturated in the erase polarity. A high level (logic 1) of this IRG signal indicates the head is reading over recorded tape, and not over an inter-record gap.

From the foregoing it is evident that certain conditions must be met before write data may be applied to the head. First the tape must have obtained its steady state velocity as indicated in FIG. 7. Accordingly, the write data and the write enable signal are delayed with respect to the $\overline{RUN}$ signal as described with reference to FIG. 7. In other words, once a "run" command is given, a predetermined start time must lapse before the write enable signal, WE, is turned on (made high). That delay is provided by the cassette IU, but before even the run command can be given, the CPU must set the operating state of the cassette IU in the write mode by an output control byte, OPCB, which selects the interface unit by its address portion and places the interface unit in the write mode by the operation code $02_{(8)}$. The next output byte, an output data byte, OPDB, is automatically accepted by the selected interface unit and five bits of it are stored in the function register of the cassette IU. The function code contains a bit 1 in the least significant bit position if operation of the tape is to be forward, which it must always be for writing, rewriting (block insertion) and reading. All other functions can be carried out in forward or reverse tape drive. The next three least significant bits of the output data byte entered in the function register contain the operation code as follows:

| OPERATION | $2^3$ | $2^2$ | $2^1$ |
|---|---|---|---|
| READ | 0 | 0 | 0 |
| WRITE | 0 | 0 | 1 |
| REWRITE | 0 | 1 | 0 |
| ERASE | 0 | 1 | 1 |
| SPACE | 1 | 0 | 0 |
| SEARCH | 1 | 0 | 1 |
| (NOT USED) | 1 | 1 | 0 |
| WIND/REWIND | 1 | 1 | 1 |

The next most significant bit, the fifth bit of the OPDB instruction entered into the function register, is the activating bit which starts the operation when it is high (logic 1) to set the $\overline{RUN}$ command. The complete function code format is as follows.

| $2^4$ | $2^3$ | $2^2$ | $2^1$ | $2^0$ |
|---|---|---|---|---|
| RUN | | OP CODE | | FWD |

The tape will continue to run until the cassette IU resets $\overline{RUN}$.

In addition to the signal BOT/EOT indicating the beginning and end of tape, the cassette interface unit receives directly from the cassette a signal CIP indicating when the cassette is in place, and a write permission signal, WP, indicating when the write/erase permission tab is present on the magazine 100 in order to indicate to the interface unit that a cassette is both present for operation and permitted to record. If the signal CIP is not present, the cassette interface unit will be inhibited from issuing a run command signal, $\overline{RUN}$. Regarding the write permission signal, it must be high (logic 1) for the interface unit to place the system in the write mode of operation. A low level (logic 0) indicates that the write/erase protection tab on the magazine has been removed. From the nature of the signals CIP and WP, it is appreciated that they are generated by microswitches that are closed when a magazine with a permission tab is properly mounted. If the permission tab on the magazine has been removed, the microswitch for the WP signal cannot be closed and the signal remains at the low level to inhibit the magazine interface unit from writing.

The organization and operation of the cassette interface unit will now be described with reference to FIG. 9 following the same format used for the typewriter IU. In order to facilitate understanding the organization and operation of the cassette interface unit, the same reference numerals will be used for parts shown in FIG. 9 corresponding to those of the typewriter interface unit shown in FIG. 2, but to maintain a distinction, the reference numeral will in each case be preceded by a 1 so that in the cassette interface unit 23, the reference numerals in the 100 series are used for those parts having their direct counterpart in the typewriter interface unit with the last two digits the same. Additional parts not having a counterpart in the typewriter interface unit will be identified by a serial number selected from the 200 series.

To further facilitate understanding, it is restated for emphasis that communication is achieved under control of the CPU by eight signals, namely $\phi 2$ clock pulses at terminal 132, $\overline{BYOT}$ output signals at terminal 130, and $\overline{OTCT}$ AND $\overline{DTEN}$ timing signals at terminal 141 142, an input/output (I/O) request at terminal 143, BYIN input data signals, and both data busy and data ready signals at terminals 201 and 202. A logic network 161 decodes the timing signals to determine whether it is a data byte transfer or a control byte transfer that is to take place as described hereinbefore with reference to FIG. 4. All output control bytes (OPCB) and output data bytes (OPDB), are received as 8-bit serial bytes, through input terminal 130 under synchronous control of $\phi 2$ clock pulses.

If the logic net 161 determines that the next mode of operation is a data or control byte from the CPU to the cassette IU, a NAND gate 160 is enabled to transmit clock pulses to a control register 131. If the transfer is of a control byte, an end of control time signal EOTC triggers a flip-flop $FF_{104}$ to set it if the address portion of the control byte is the same as a stored address code of the cassette IU. In that manner, the flip-flop $FF_{104}$ transmits a select signal SEL when the address portion of a control byte entered into the control register 131 corresponds to the address of the cassette IU.

The control code in the four least significant bits of an output control byte is strored in a register 171 for decoding by a decoder 172. There it is decoded, but only if the flip-flop 104 has been set, and not until a data transfer mode (DTM) is decoded by the logic net 161. Most of the control codes are the same as for the typewriter and teletypewriter interface units except that the cassette IU does not use the interrupt system of the CPU. Instead the CPU is dedicated to the cassette IU once a data transfer operation is initiated until the CPU terminates it. Therefore the cassette IU has no provision for decoding the octal control codes 14 and 15 used for disabling and enabling an interrupt signal INT2, i.e., disabling and enabling interrupt capabiliy. The octal control codes which are decoded by the decoder 172 are as follows:

| | |
|---|---|
| 00 | Read status register |
| 01 | Read data into CPU |
| 02 | Write data into tape |
| 04 | Load search buffer |
| 05 | Read device/key register |
| 06 | Load output data byte into function register |
| 13 | Restore (reset interface unit) |

Comparison of that table of functions with a corresponding table for the typewriter or teletypewriter reveals that there is an additional code, 04, provided for the cassette IU to load a search buffer with the number of a block of data on the tape where the blocks are numbered sequentially from the beginning of the tape. As will be noted more fully hereinafter, the number is entered into the search buffer in the 1's compliment such that, upon counting inter-record gaps, a carry is produced when the right number of inter-record gaps have been traversed. For example, if the sixth block is designated, the search buffer is stored with the 1's compliment of the number for the sixth block, namely 1 . . . 1001 (as noted hereinbefore the blocks are numbered sequentially in octal code from 0000 to 4095). When the sixth inter-record gap is detected (by the absence of any transition flux) a sixth bit 1 is added to the content of the search buffer to produce a carry. That stops the search.

When a mode 06 is detected by the decoder 172, a logic network 185 transmits a write function select signal WFS to the function register 184 at the end of the next data transfer time $\overline{EODT}$ to cause the least significant five bits (not four as in the case of the typewriter IU) of the next input data byte entered into the register 131 to be transferred to the function register 184. A control network 183 decodes the content of the function register to generate the signals necessary to control the tape motion control unit 101 and the read/-write unit 104.

Once the interface unit has been set in a write data mode by the octal code 02 decoded by the detector 172, the logic network 185 is enabled at the end of each following data transfer time to produce a write data signal, WDS, to cause the control network 183 to transfer in parallel a data byte from the control register 131 into a buffer register 181 for serial recording through the read/write unit 104 while the next data byte is being entered into the control register 131.

If the control code in the register 171 is an octal 01 to read data, the logic network 185 is enabled at the end of data transfer time to transmit a read data signal, RDS, to the control network 183 which then sets the read/write unit 104 to read data serially into the buffer register 181. After every 8th bit entered serially into the buffer register 181, the control network 183 causes the contents of the buffer register 181 to be transferred into buffer register 180 for serial transfer to the CPU through a gate 134 enabled by the decoder 172. The process of reading data into the CPU continues until the cassette IU has detected the trailing inter-record gap.

The operations called for by the octal codes 00 and 05 to read the contents of the status register 145 and the device key register 174 through respective AND gates 135 and 136 is as described hereinbefore with reference to FIG. 2 for the typewriter IU. The read gates 135 and 136 enabled by the respective octal operation codes 00 and 05 are connected to terminal 133 by OR gate 137.

The role of the status register is the same as in the typewriter IU. The conditions to be monitored are: power on (PON); input-output request (IOR) which sets flip-flop 101 to transmit an I/O request signal to the CPU through terminal 143; when the cassette is in the run mode (ACT), which is distinct from when the cassette IU is actually engaged in the process of transferring data as indicated by the signal data busy at terminal 201 transmitted over interconnecting cables to termnal 54a (FIG. 3); end of file (EOF), which occurs when the cassette is stopped by a time-out circuit 220 to be described hereinafter; write-permission (WP); clear leader (LEADER) which occurs at the beginning and end of the tape, and is derived from BOT/EOT as will be described hereinafter; and any number of conditions which may be termed "hard errors" that are ORed into one signal, HE, such as cassette door open (DO) and cassette not in place ($\overline{CIP}$). These are termed "hard errors" because execution of the programmed sequence involving the cassette cannot proceed without correction by the operator. The sequence begins with reading the status register, checking for error and printing out an error message.

Another condition that may be ORed as a hard error is that power has just been turned on in the cassette IU. Since the position of the tape when last used is not likely to be known at the time the programmed sequence is prepared, the sequence will follow up a detection of this condition with a subroutine to rewind the tape. Otherwise, any attempt to execute the sequence will likely result in hopeless confusion. Consequently, although not a hard error that requires operator assistance, it may be included as a hard error in the status register. The results is that when an error message is typed, an attempt will be made to rewind the tape before looping back into the subroutine to read and check status. If an error is still present, the sequence will branch to an idle routine until the error is corrected by the operator and operation of the CPU is restored.

All of the inputs to the status register are arranged to be provided by the control network 183, except the input-output request, IOR. Such an arrangement is merely a matter of convenience, particularly in respect to hard errors which are unique to the cassette IU. However, they may be provided by logic networks arranged to be grouped with any other logic network section. Consequently, they are shown simply as inputs to the status register 145 in FIG. 9.

A time-out generated signal, EOF, stored in the status register is also an indication of an error, but of a different type termed a "soft error". A soft error is one of such a nature that it would be possible to ignore the error and go on with otherwise normal use of the cassette. Other types of soft errors are detected by the CPU. The operator has the option of treating a soft error in the program in the same way as a hard error, or to bypass the error indication after printing an error message. If he elects the latter, the operator can provide for whatever disposition of the error he wishes and then continue with subsequent routines that he has programmed. This allows arrangement for some operating errors to be detected in the CPU rather than the cassette IU for the flexibility of completion of all routines during unattended operation. Examples of soft errors will be pointed out in the following description.

The role of the device/key register 174 is also the same as in the typewriter IU. Nine keys are provided on a keyboard 144 at the cassette IU to enable an operator to control cassette input and output operations through the CPU from the cassete IU. The keys are as follows:

| CODE | KEY | FUNCTION |
|------|-----|----------|
| 1111 | REWIND | Causes high speed rewind |
| 0010 | WRITE | Causes one block of data to be written |
| 0001 | READ | Causes one block of data to be read |
| 1101 | FWD SPACE | Causes tape to be advanced one block |
| 1100 | BACK SPACE | Causes tape to be rewound one block |
| 1110 | SEARCH | Causes search for block specified by CPU entry. |
| 0011 | REWRITE | Causes block of data to be written over existing block of same size. |
| 1011 | LOAD AND GO | Causes block on tape to be read into CPU program memory beginning at strips 0000 of program. Execution of program thus entered begins immediately |
| 1010 | ERASE | When ERASE ENABLE has been depressed causes all of the tape to be erased from the current position to the end. |

All action called for by these keys is controlled by the CPU as though a stored program instruction called for the action. The keyboard is merely a way for the operator to effectively insert commands for immediate execution.

An encoding unit 175 translates each key entry into a four bit code and at the same time transmits an IOR signal to set the flip-flop $FF_{101}$. Once the content of the device/key register is read into the CPU upon detecting an I/O request signal from the flip-flop $FF_{101}$, the CPU takes the action called for. The flip-flop $FF_{101}$ is reset when the CPU transmits an output control byte comprised of the address of the IU having the I/O request signal and the 00-mode code for a read status operation. A following input data byte (IPDB) instruction then causes the content of the status register to be read into the CPU.

Before proceeding with a description of the control network 183, the manner in which a search buffer (counter) 210 is loaded and used will be described. As noted hereinbefore, the blocks of data (records) are numbered in sequence, from 0000 to a maximum of 4095, starting at the beginning of the tape with zero. To search for a particular record, the search buffer is loaded with the 1's compliment of the number of the record desired.

The CPU stores the record number for the current position of every cassette attached. That number is updated each time a tape motion command is executed. When writing on the tape, the record number is automatically written as part of the record for checking after the record is again addressed by a search command.

The sequence for a search is to first output a control byte (OPCB) to the control register 131 with an octal code 04 for the write search buffer. The 04-code is decoded by the decoder 172 to enable 4-bits to be loaded into section A of the search buffer 210 from the four most significant bits (MSB's) of the output data byte (OPDB) that follows from the CPU into the control register 131 at the end of the data time, $\overline{EODT}$. An AND gate 211 is enabled by the 04-code signal to transmit the $\overline{EODT}$ signal to an AND gate 212 and to the clock input of a D-type flip-flop $FF_{201}$ which is then set to enable an AND gate 213. The CPU then outputs another data byte. The following EODT signal strobes all eight bits of that second data byte into sections B and C, with the least significant bits (LSB's) in section B. The 12 bits thus entered into the search buffer 210 constitute the 1's compliment of the record number to be searched with the LSB's in section A. The CPU next outputs a control byte with the octal code 15. That disables the gate 212, and at the end of the control transfer time, the signal $\overline{EOCT}$ is transmitted through a gate 214 to reset the flip-flop $FF_{201}$. The cassette IU is now ready for a search.

To make the search the CPU transmits a write function code (06) addressed to the cassette CPU to put it in the write function mode, and then transmits a data byte (OPDB) having a search code (11011) that is entered into the function register 184. The control network 183 decodes the search code and sets the tape motion control 101 to run forward at 30 IPS. Note that by setting the least significant bit of the code to zero the tape motion could be set into reverse, but forward searching is the normal way to proceed. The search then proceeds off-line, i.e., independent of the CPU. The read/write unit 104 is set in the read mode as the tape moves at a search speed of 30 IPS, and the search proceeds by counting inter-record gap (IRG) pulses. A CARRY out of the search buffer resets the control network 183 to stop the tape motion control. The tape is now positioned for reading, writing or rewriting in the block that follows.

A unique feature to be described more fully hereinafter is that the tape motion will be stopped by the time out counter 220 turning off the signal $\overline{RUN}$ if a search is attempted over a blank position of tape or an entirely blank tape. Since there is 300 feet of tape in a magazine, much time would be wasted in searching for something not present. To terminate the search after a certain maximum period of time, the time-out counter 220 is set by the control network 183 when a search is initiated. That counter counts clock pulses (CP) from a local oscillator and is continually reset by IRG pulses. When a predetermined number of CP pulses have been counted, a carry is transmitted to the control network to terminate the search by resetting the run command. As long as there is data on the tape beng read, IRG pulses will reset the counter before a carry occurs, even at the slow speed of 6 IPS used for reading. This time out feature produces a soft error signal upon terminating the run command.

The time-out counter 220 is also enabled during read, rewrite and space functions, and is disabled during rewind (forward or reverse), erase or write while on tape. While on leader at either end of the tape, the time-out counter is enabled in response to the signal BOT/EOT regardless of the function specified by the content of the function register 184. This is for the reason that if the tape motion control unit 101 is set to run forward when on leader at the end of the tape, or to run in reverse when on leader at the beginning of the tape, it will not be possible to complete the operation, unless the operation is to rewind forward or reverse, in which case the operation is already complete. The size of the counter and frequency of the CP pulses are selected to time out after 50 inches of tape motion at the search or space speed of 30IPS, which is after about 1.7 seconds. That is adequate time for the tape motion to move tape under the head if motion is in the proper direction. Failure to reset the counter in that time stops the tape motion and initiates a signal EOF.

Before proceeding with a more detailed description of this time-out feature, the sequence for writing, reading and rewriting a record will be described with reference to FIGS. 10, 11 and 12. The sequence for writing is commenced by the CPU after the record has been positioned by a prior operation, such as a search, read or write (in the case of reading or writing the preceding record) or space operation under control of a function code in the register 184. It is commenced by first outputting a mode-06 control byte to select the cassette IU, and then outputting a data byte to the function register 184 with the proper code 10011 to set the tape motion control unit 101 to run forward at low speed, and to transmit a write enable (WE) signal to the read/write unit 104. This causes a zero to be recorded as the leading record gap for about one inch of tape as determined by an analog timer in the control network 183 triggered upon decoding the write function code at the end of data transfer (EODT) of that code into the register 184.

Activating $\overline{RUN}$ causes the control network 183 to transmit a data busy signal through terminal 202. The CPU detects acceptance of this write function by examining the data busy signal. If the IU does not respond with a data busy signal, the CPU program can cause some appropriate action to be taken. Assuming the IU does respond as it should, the CPU is dedicated by its stored program to the task of transmitting data to be recorded in 8-bit bytes, including a preamble 10101010 transmitted by the CPU, after a period set by a gap timer. An integrally generated write clock triggers a flip-flop at the end of the gap time to enable input data bytes to be clocked in sequence to the read/write unit 104 from the buffer register 181 until the last data byte is written. The the flow of data stops, but the read/write unit 104 is still receiving a write enable signal, WE, to enable a trailing gap to be recorded with the erase polarity for a period set by the gap timer which is again triggered. The gap timer then turns off the run signal to shut off write enable and bring the tape motion to a stop.

Referring to FIG. 10, and assuming the cassette Iu has already been selected and put into the write mode to start recording a leading gap, the actual transfer of data is begun by the CPU upon transmitting a mode-02 control code to the register 171. Because the register 131 is then empty, while the mode-02 signal is active, a data ready signal is transmitted by the control network 183. The CPU detects the data ready signal and transmits the first data byte during an ensuing data time, DTM. At the end of the record gap time, the first byte of data (the preamble) is transferred to the buffer register 181 for it to be written. The data ready signal is then again high, as shown in FIG. 10 to call for the next byte (LSD of check character) to be transferred to the register 131. A write data sync counter counts the bits recorded from the register 181, and afer counting 0 through 7, causes the next byte of data to be transferred to the register 181 and calls for another data byte to be transferred into the register 131 by setting the data ready signal. This continues until the last byte to be written is transmitted, each time resetting the data ready signal. Immediately after the last data byte is transmitted, the CPU is free to start executing the next task while the last byte is recorded. Consequently, another data byte is not transmitted, and the data ready signal remains on such that when the write data sync counter overflows while data ready is still present, a stop write signal is transmitted to trigger the gap timer for a trailing gap. When the gap time runs out, it resets the RUN signal to stop tape motion. The tape motion control unit then takes over for a programmed stop of the tape.

The timing diagram of FIG. 10 shows RUN set to a high level (logic 1) from the CPU at some time prior to the 02-mode being set and three data transfer modes, DTM's, to transfer three bytes of data. The data busy and data ready signals are active until the stop write signal is generated. The shaded areas of the data ready signal indicate the time during which the CPU may transfer the next data byte. The preamble is written during 8 clock periods immediately following the signal WE, which is while the preamble written signal, PE WRIT, is high. Following the stop write signal, the signal RUN is set low after the record gap timer triggered by the stop write signl runs out in approximately 166 ms for one inch of tape at 6 IPS.

The read sequence illustrated in FIG. 11 is much simpler. Before data is to be read, the tape is positioned to the inter-record gap immediately in front of the record by searching, or by just having read or written the previous record, or by just having completed a rewind in the case of reading the first record. Once the tape is positioned, the cassette IU is selected by an output control byte having the octal code 01 entered into the register 171 and placed in a read function by a following output data byte with the code 10001 entered into the function register 184. The cassette Iu responds by starting the tape motion control unit in the forward direction at a low speed of 6 IPS. The read data and read clock from the read/write unit 104 is accepted to enter the data into the buffer register 181.

FIG. 11 shows the control mode signal 01 and the read clock. A data pulse (not shown) accompanies each read clock. A counter in the control network 183 counts the read clock pulses and after every eight clock pulses, generates a set ready signal that transfers the data from the buffer register 181 to the output buffer register 180. All of this time, a data busy signal is transmitted by the control network 183, and each time a data byte is transferred to the output register 180, a data ready signal is transmitted by the control network to signal to the CPU to input a data byte from the output register 180. The data transfer times, DTM's, follow under CPU control. At the end of each DTM, the data ready signal is reset. Note that a data transfer under CPU control is at a much higher rate such that all 8-bits are transferred serially in about one clock time of the read clock.

The leading record gap is detected by the read/write unit to produce an IRG signal which is filtered by the control network 183 for four clock periods shown by the shaded area of the IRG waveform. Until four successive clock pulses have been counted, each before an analog timer set by the preceding one runs out, the IRG signal received by the control network is kept high. This prevents spurious pulses from causing the reading operation to commence. If a clock pulse is not received during this filtering period, the filtering begins again and the buffer register 181 is reset. After the last byte has been read, the IRG signal is again filtered for four successive read clock periods before it is permitted to go high in the control network 183. When it does go high, a stop read signal is generated as shown in FIG. 11 to turn off the data busy signal and release the CPU for other tasks.

Figure 12:
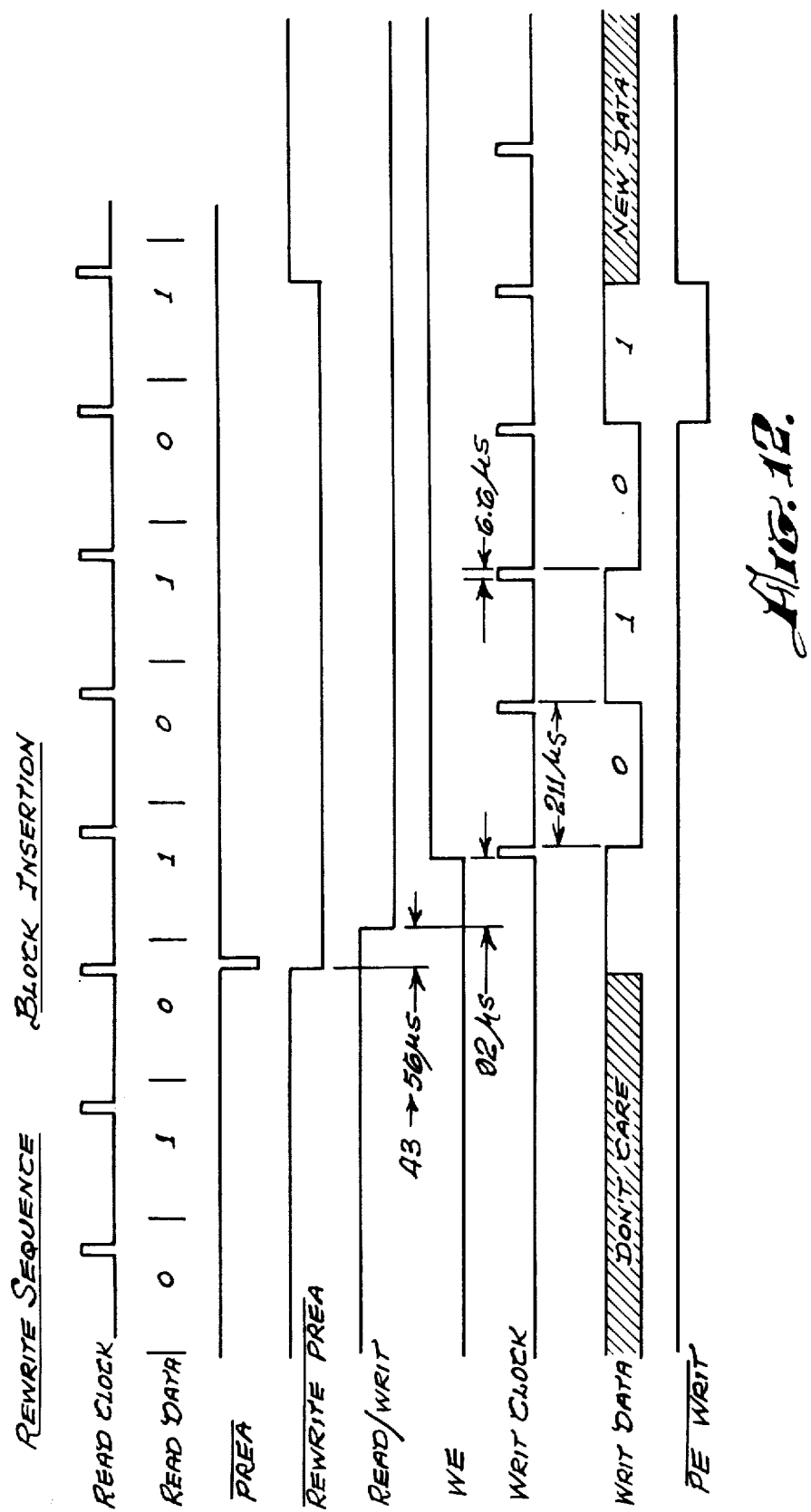
FIG. 12 is a timing diagram of a rewrite sequence of the cassette interface unit.

The sequence for rewriting a record is similar to the sequence for writing except at the beginning shown in FIG. 12. After positioning the tape and entering the rewrite function code 10101, the write enable signal WE is held low by the control network 183 and data is read directly into the control network with the read/write signal high to read until the first three bits of the data being read from the tape is detected as 010. Then the control network generates a preamble signal, PREA, which sets a rewrite preamble signal, REWRITE PREA low. Within 43 to 56 µ sec, the read/write signal is set low to switch the read/write unit 104 to low for writing. Thereafter, in 92 µ sec, the write enable signal, WE, is set high to commence writing, but instead of writing the full preamble, as for a normal write operation, only the last four bits are written. The first three were read to detect the preamble already on the tape, and the fourth bit was scanned while converting from read to write. Once the four remaining bits of the preamble were rewritten, new data to be recorded follows as for the normal writing sequence. This transition to the normal writing sequence is initiated by a preamble written signal, PE WRIT, generated by the control network while recording the last bit of the preamble as shown in FIG. 12.

The time-out circuit 220 of FIG. 9 will now be described with reference to FIG. 16, but first the manner of generating an inter-record gap signal IRG and other necessary signals will be described with reference to FIGS. 13, 14 and 15. As noted hereinbefore with reference to FIG. 7, the read/write unit 104 derives read clock pulses from the data output signal received from the read head in a conventional manner. Commercial cassette tape units will often provide an inter-record gap signal which indicates when there are no data clock pulses being read. The difficulty with using such an inter-record gap signal is that noise on the tape may yield a clock pulse to cause a spurious bit to be read out into the buffer register 181. From that point on, all the data read from the block will then be in error. To avoid such an error, the present system requires successive data clock pulses to be received in the time span that such pulses should be received following an inter-record gap, and if less than four successive pulses are not received, the signal IRG will remain true (high).

Figure 13:
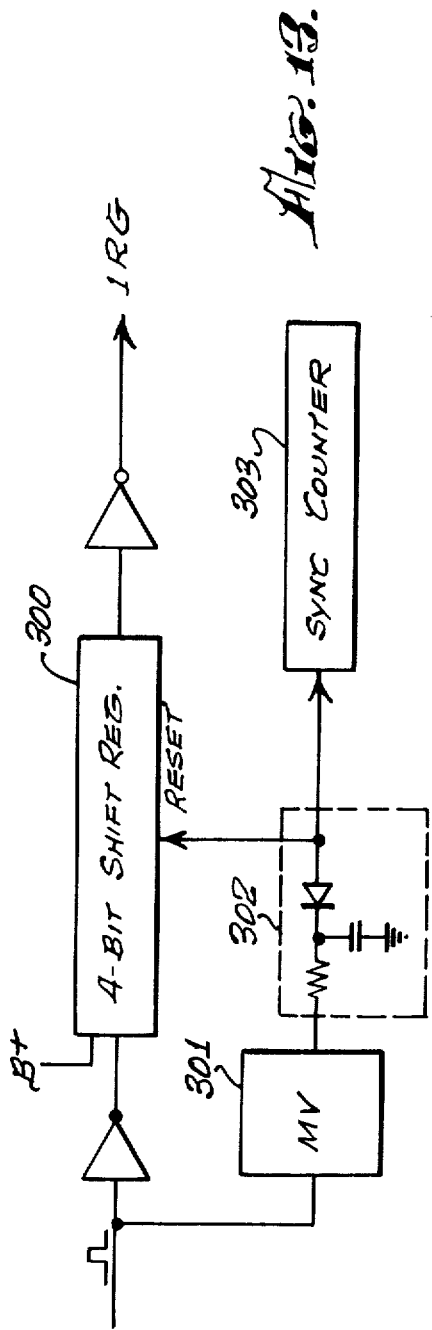
FIG. 13 is a logic diagram of a circuit for generating an inter-record gap signal from signals read from the cassette magnetic tape in FIG. 6.

Referring now to FIG. 13 read clock pulses received from the read/write unit 104 are employed as clock pulses to a 4-bit shift register 300 having a hardwired bit 1(B+) connected to its data input. Consequently, four read clock pulses must be received before the register is filled with binary 1's to produce a bit 1 (high) output. The inverted output is then the signal IRG which remains high during the inter-record gap and into the recorded block for four read clock pulses as shown in FIG. 11.

Each read clock pulse received by the shift register 300 triggers a multivibrator 301, the output of which is connected to a reset terminal of the shift register 300 such that when the output of the multivibrator goes low again, the shift register is reset on the transition from high to low. That is accomplished by a differentiating circuit 302 at the reset input. The period of the multivibrator is set to approximately 1.5 times the period of the clock pulse so that if successive read clock pulses are received, the multivibrator is retriggered before its RC-time runs out. Consequently, the inter-record gap will go low after four successive read clock pulses are received and will stay low as long as successive clock pulses are received.

If a spurious clock pulse is received after a gap, it will cause a false bit to be read, but when the RC time of the multivibrator 301 runs out, it resets the shift register 300 and an 8-bit sync counter 303. The sync counter is used to count the bits of the data bytes. After every data byte (i.e. after every 8 bits), it causes the byte in the register 181 to be transferred into the buffer register 180. Once four succesive read clock pulses have been received, it is known that the end of the inter-record gap has been reached, but the delay of four bit times in determining that fact has not caused a single bit of data to be missed.

If after IRG goes low a read clock pulse is missed, the multivibrator 301 will time out, reset the 4-bit shift register 300 and sync counter 303. The positive going leading edge of the IRG signal will then cause a stop read pulse to be generated as shown in FIG. 11. The result is that the CPU will receive an incorrect number of characters from the block. That error will be detected by the CPU to cause a soft error message to be printed. The operator can program for the block to be read again one or two more times. If still not successful, the program can either cause a hard error message to be printed or for some other action to be taken.

Figure 14:
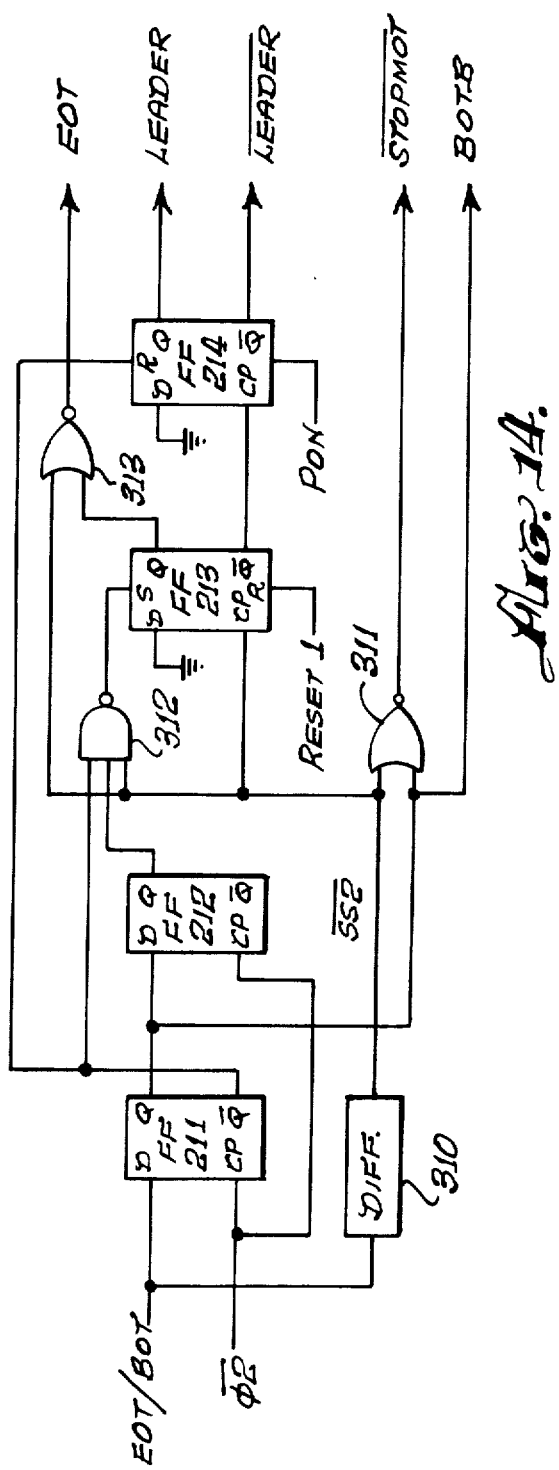
FIG. 14 is a logic diagram of a circuit for generating signals used for the timeout function of the cassette interface unit.

Other necessary signals for the timeout function are generated by the logic network of FIG. 14. This implementation of the timeout function assumes that the tape is compatible with the standards of the European Computer Manufacturers Association which requires a hole in the magnetic tape at each and spaced from the clear leader at predetermined distances less than 50 inches, which is the extent of tape motion at 30 IPS during the timeout period of about 1.7 seconds. As the hole at either end passes over the phototransistor employed to originate the signal EOT/BOT, that signal will go true for a short period. The leading edge of the resulting pulse is detected by a differentiating circuit 310 to produce a negative clock pulse $\overline{SS2}$ applied to NAND gates 311 and 312, and to the clock input terminal of a D-type flip-flop FF213. The signal EOT/BOT is clocked into a D-type flip-flop FF211 to produce a buffered EOT/BOT signal identified as BOTB. If at the end of a pulse $\overline{SS2}$, BOTB is true (i.e., the phototransistor is on clear leader) the gate 311 transmits a signal $\overline{STOPMOT}$ to stop the tape drive motor by turning off RUN to the tape motion control unit 101 (FIG. 6). That is an automatic shutoff on reaching the end of tape in either direction.

At the beginning of the tape, starting at either end, the buffered EOT/BOT signal is copied into a D-type flip-flop FF212 on the next clock pulse $\phi 2$. As the flip-flop FF211 is set, its false ($\overline{Q}$) output sets a flip-flop FF214. When the flip-flop FF211 is reset on the edge of the clear leader, the gate 312 is enabled to set the flop-flop FF213. The false ($\overline{Q}$) output of the flip-flop FF213 then causes the flip-flop FF214 to be reset. The result is a signal LEADER which is true, while the phototransistor is on tape between the edge of clear leader and the hole on the tape. The compliment $\overline{LEADER}$ is also generated for use by the timeout circuit, as the 300 feet of tape is run through, the hole at the other end produces a signal SS2. Since the flip-flop FF213 is by the reset, a NOR gate 313 is enabled to translate the pulse SS2 into an end of tape pulse EOT.

The flip-flop is initially reset by a signal RESET 1 when power is first turned on.

Figure 15:
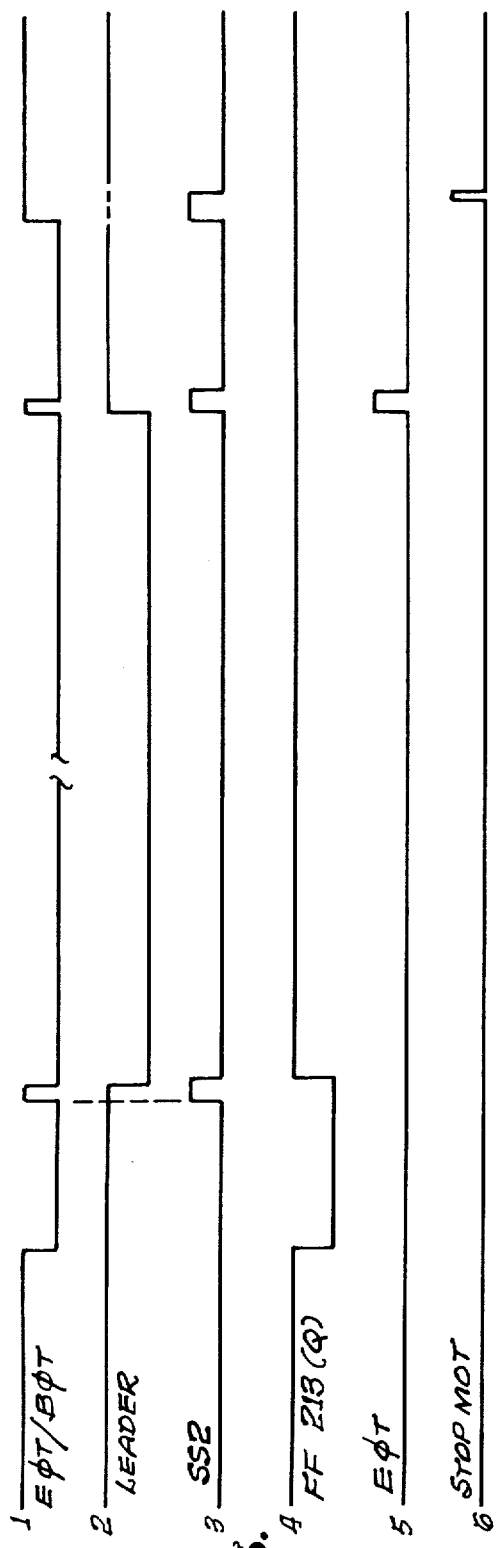
FIG. 15 is a timing diagram useful in understanding operation of the logic diagram of FIG. 14.

FIG. 15 shows a timing diagram that summarizes the operation of the logic network of FIG. 14. Briefly, the signal LEADER is true except when the phototransistor is on magnetic tape between holes which, when detected produce pulses SS2. Another pulse SS2 is produced when the clear leader is reached at the end of the tape, but before that occurs, the true output of the flip-flop FF213 cooperates with the pulse SS2 produced by a hole in the tape to generate a pulse EOT signaling the end of the tape. The signal EOT/BOT buffered by the flip-flop FF211 cooperates with the third pulse SS2 to generate a pulse STOPMOT. This timing diagram shows only the true signals. The false signals actually used or referred to hereinbefore indicated by a bar over the signal designation) are, of course, merely the compliments of those shown in FIG. 15. What is important to understand from that diagram is only the relative timing of the signals.

Figure 16:
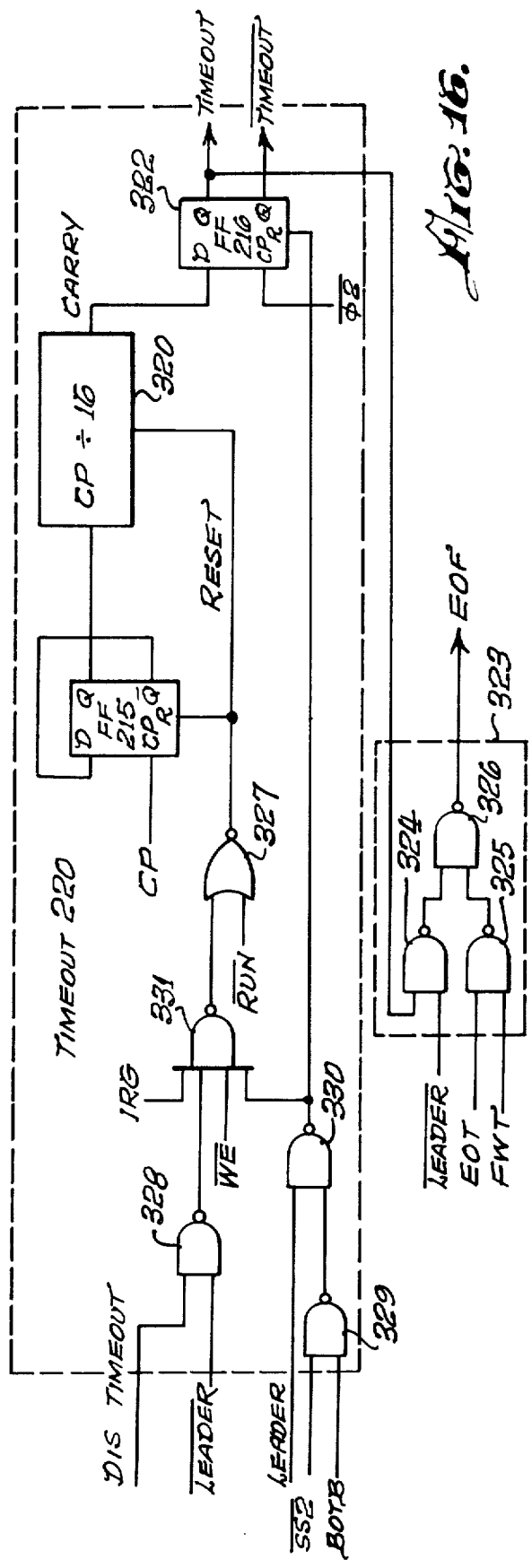
FIG. 16 is a logic diagram of a circuit for implementing the timeout function of the cassette interface unit.

Referring now to FIG. 16, the timeout circuit is comprised of a binary counter 320 which counts time clock pulses CP from a stable multivibrator. The clock pulses are divided by 2 in a D-type flip-flop FF215 and then by 16 in the counter for a total division by 32. The period of the clock pulses is selected to yield a timeout period of about 1.7 seconds, at which time a carry from the counter is entered into a D-type flip-flop FF216 which then transmits a signal TIMEOUT to reset RUN. That stops the tape drive motor. A logic network 323 produces a soft error signal EOF if timeout occurs while not on leader by the logic TIMEOUT $\overline{LEADER}$ of NAND gate 324 or if at the end of the tape and the direction of drive is forward by the logic FWD.EOT of NAND gate 325. NAND gate 326 ORs the output of the two NAND gates 324 and 325. The soft error signal EOF is entered in the status register 145 (FIG. 9) for a stored program in the calculator to detect and process in whatever manner the programmer wish, which may be to call for the operator to check for an error before going on or to simply bypass the error and go on.

The function of the timeout circuit is to produce a TIMEOUT signal after about 50 inches of tape at 30 IPS if an interrecord gap signal IRG does not reset the flip-flop FF215 and counter 320 through a NOR gate 327 enabled by $\overline{RUN}$ whenever the tape drive motor is running. A NAND gate 328 controls periods during which the timeout function is inhibited. At all other times, the timeout function will operate to cause the soft error signal EOF to be generated if an interrecord gap is not detected to produce a resetting signal IRG. The times when the timeout function is operative to generate a soft error signal EOF are:

1. In the read mode, on starting to read a data block. If there is no data block, the IRG signal described with reference to FIG. 11 will not be generated to reset the timeout circuit.
2. In the rewrite mode, a block must be present on the tape over which a new block is written. If an IRG signal is not generated to mark the beginning of the block, the timeout period runs out.
3. In the space mode, either forward or backward, if no interrecord gap produces an IRG signal within the timeout period, the period runs out.
4. In the search mode, interrecord gaps must be continually detected during the entire search as blocks of data are counted to reach the specified block. If an interrecord gap is not detected in a timeout period, the period runs out.

5. In erase and rewind (forward or reverse) modes, the timeout period will always run out if the leader is reached and RUN is not terminated before the timeout period expires unless a hole in the tape is detected before the timeout period expires, which means that there will be timeout generated soft error signal EOF only if the operation extends into the end of the tape.

During erase and wind or rewind (forward or reverse), and while not on leader, the counter 320 is inhibited by being continually reset through the NAND gate 328 enabled by a signal DIS TIMEOUT generated by the control network on the basis of the function code in the register 184 (FIG. 9). The signal $\overline{\text{LEADER}}$ is true only while not on leader as determined by the logic network and FIG. 14. The NAND gates 329 and 330 determine when a hole has been detected while on leader to reset the timer and prevent a timeout if the tape is being run forward from the beginning of the tape, as indicated by the signal BOTB. That takes care of the fifth category of timeouts. At all other times, except while writing when $\overline{\text{WE}}$ continually resets the counter, the timeout function is effective. Each IRG resets the timeout circuit. That takes care of all other categories 1 through 4 of timeouts. A NAND gate 331 functions as an OR gate to combine the reset signals of category 5 with those of categories 1–4.

The timeout circuit shown in FIG. 16 implements the function of the block 220 in FIG. 9. The circuit 323 of FIG. 16 is contained in the block 183 of FIG. 9 as part of the control network. However, it is only a matter of design choice as to how the functional blocks are divided just as it is a design choice as to how the various functions described are implemented.

The purpose of the timeout function is to save unnecessary loss of central processing time. For example, if the program includes an inadvertent instruction to read a block of data, and there is no data, the tape will run out to the end. Instead of taking all that time while the central processor is idle, the timeout function allows a certain maximum period. If nothing happens in that period, the signal EOF is set in the status register to indicate an error. That allows the programmer to check for such an error and to either hault operation or bypass the error. That permits unattended operation in that it is up to the programmer whether he wants to hault operation on a timeout error (a soft error) or to bypass that section of the program and continue with other sections.

Although a particular embodiment of the invention has been described and illustrated herein, it is recognized that modifications and variations may readily occur to those skilled in the art. It is therefor intended that the claims be interpreted to cover such modifications and variations.

What is claimed is:

1. A data processing system comprising a central processing unit having a receptacle through which an interface unit of a peripheral device is connected by an associated cable, said interface unit having a receptacle to which another interface unit may be connected by its own associated cable such that separate cables associated with seperate interface units are connected in series, and the interface units are connected in parallel to the central processing unit through the series connected cables, each interface unit being connected to a particular device having its own function of inputting and outputting data words to and from said central processing unit, each interface unit being assigned a unique address code, particular mode-control codes and particular function control codes, and each interface unit having a single input register to receive output words from said central processing unit through said series connected cables, each of said output words being comprised of a predetermined number of binary digits representing either an address code and a mode-control code combined, a function control code or data, means connected to said input register for decoding an address code and a mode control code to select a particular device for a particular mode of operation, means conected to said input register for decoding a function code for controlling a particular function of said particular device within said particular mode, and means responsive to mode control signals tranmitted by said central processing unit over said series-connected cables for controlling the utilization of output words stored in said input register as an address code and mode-control code combined, a function control code or data, each interface unit further having gating means for transmission of input data words to said central processing unit through said series-connected cables, each of said input data words being comprised of a predetermined number of binary digits, said gating means being connected to be responsive to said mode-control decoding means.

2. A data processing system as defined by claim 1 wherein each interface unit includes a status register and means for storing binary digits in said register independent of said central processing unit, each of said binary digits including the status of some aspect of the particular device serviced by the interface particular means for connecting said status register to said gating means for the purpose of inputting to said central processing unit through said series connected cables the content of said status register under control of said gating means by a particular mode-control code.

3. A data processing system as defined by claim 2 wherein at least one of said interface units includes keyboard means for manual inputting of binary coded signals to said central processing unit, a keyboard register for storing binary coded signals from said keyboard means, means for connecting said keyboard register to said gating means for the purpose of inputting to said central processing unit through said series connected cables the content of said keyboard register under control of said gating means by a particular mode-control code operating said gating means.

4. A data processing system as defined by claim 3 wherein a plurality of interface units include a keyboard means, and wherein each keyboard register includes means for entering as part of the binary coded signal inputted to said central processing unit a code uniquely identifying the interface unit and means for entering a binary digit in a predetermined position of said status register indicative of the fact that said keyboard means has been actuated for manual inputting of binary coded signals.

5. A data processing system as defined by claim 4 wherein each interface unit includes means for setting and transmitting to said central processing unit a signal through said series connected cables indicating that a keyboard entry has been made into said keyboard register and that a binary digit has been entered in said perdetermined position of said status register.

6. A data processing system as defined in claim 5 including means responsive to said address decoding means and said mode control decoding means for resetting said signal that indicates a keyboard entry has been made into said keyboard register, thus terminating transmission of said signal to said central processing unit when said central processing unit responds to said signal with an appropriate address code and mode control code in an output word.

7. A data processing system as defined in claim 2 wherein at least one of said peripheral devices is a magnetic tape cassette and the interface unit servicing said cassette includes means for detecting gaps between records, each record comprising a block of data, timeout means operative when said cassette interface unit is active in controlling the cassette for initiating an error in the condition when a predetermined time measured by said timeout means expires, and means for resetting said timeout means in response to each inter-record gap detected by a said gap detecting means, thus initiating an error indication if an inter-record gap is not detected within a maximum time.

8. A data processing system as defined in claim 7 wherein said error indicating means comprises means for setting a binary digit in said status register, thus permitting a stored program in said central processing unit to test for an error and take appropriate action.

9. A system for coupling an indeterminate number of peripheral devices to a central processing unit through a single receptacle for direct synchronous communications between said unit and any selected one of said devices in response to programmed instructions, said system comprising an interface unit for each device, each device interface unit having a cable adapted to be plugged into a receptacle through which signals are transmitted to and from said central processing unit, and having a receptacle into which a cable of another device interface unit may be plugged in, thus connecting cables of all device interface units in series and the device interface units in parallel, each interface unit being organized in the same way for two-way communication over separate series-connected lines in said series-connected for cables communication in each direction and having register connected to said cable to receive both data and control code groups of binary digits under control of mode control signals from said central processing unit transmitted through separate lines over said cable means for decoding an address code in a received control code group of binary digits by comparison with a fixed code assigned to the interface unit and its connected peripheral device, means responsive to both said address decoding means and said mode control signals for controlling the utilization of groups of binary digits as data and control codes, and for storing and decoding a control code group of binary digits subsequent to a control code group having said address code when said mode control signals are in a control transfer mode, but only by the addressed interface, said storing and decoding means providing static decoded control signals until said mode control signals are again in the control transfer mode to address an interface unit, and means for transmitting synchronizing clock pulses to all interface units in parallel by said central processing unit through said series-connected cables.

10. A system as defined in claim 9 wherein a group of binary digits is transmitted from a selected one of a plurality of registers in an addressed peripheral device interface unit to said central processing unit in response to said control code storing and decoding means while said mode control signals are in a data transfer mode immediately following a control transfer mode.

11. A system as defined in claim 10 wherein one of said plurality of registers is a status register storing a group of binary digits indicative of the status of said addressed peripheral device interface unit.

12. A system as defined in claim 11 wherein each interface unit includes keyboard means for manual inputting of binary coded signals, and one of said plurality of registers is a keyboard buffer register storing a group of binary digits manually inputted through said keyboard means and including means for setting a predetermined binary digit in said status register in response to any keyboard entry, and means for transmitting a signal to said central processing unit indicative of the fact a keyboard entry has been made, whereby a program stored in said central processing unit may read the status register of each interface unit to determine which has a keyboard entry stored in a keyboard register.

13. A data processing system as defined in claim 12 including means responsive to said address decoding means and said control-code storing and decoding means when said mode control signals are in a control transfer mode for terminating transmission of said signal to said central data processing unit indicating a keyboard entry has been made when said central processing unit responds to said signal with an appropriate address code and control code transmitted to said control register.

14. A system as defined in claim 11 including in each interface unit a function register connected to said control register for storing a function code transmitted to said control register in response to said control code storing and decoding means enabled by said address decoding means when said mode control signals are in a data transfer mode following a control transfer mode during which an address and control code was transmitted to said control register, thereby placing only an addressed interface unit into a function mode for operation of said peripheral device in accordance with the function code.

15. A system as defined in claim 14 including means in at least one interface unit of slow peripheral device for generating an interrupt signal and transmitting said interrupt signal to said central processing unit through said series connected cables whenever said peripheral device operating under control of said function code in said function register requires a data group of digits to be transmitted between said peripheral device and said central processing unit, and means for storing a binary digit in a unique location of said status register indicating that an interrupt signal has been generated, whereby said central processing unit may, under its programmed control, read out the contents of said status registers in peripheral device interface units in sequence to determine which has generated an interrupt signal in order that the interface unit which has done so be serviced.

16. A data processing system as defined in claim 12 including means responsive to said address decoding means and said control code storing and decoding means when said mode control signals are in a control transfer mode for terminating transmission of said interrupt signal when said central processing unit responds to said signal with an appropriate address code and control code transmitted to said control register.

17. A system as defined in claim 16 including bistable means in each peripheral device interface unit having an interrupt signal generating means for inhibiting a signal generated by said interrupt generating means from being transmitted over said series-connected cables, said bistable means being set by a control code stored and decoded by said storing and decoding means in each peripheral device interface unit at the end of a control transfer mode in order to inhibit interrupts under programed control, said bistable means being reset by another control code stored and decoded by said storing and decoding means in each peripheral device interface unit at the end of a control transfer mode to restore interrupts under programmed control.

18. A system as defined in claim 11 wherein one of said interface units is for control of a magnetic tape unit for storage and reading of blocks of data, said blocks of data being separated by blank interrecord gaps, said one interface unit including means for detecting interrecord gaps, means for timing out a predeterined period greater than a maximum time required to drive tape past a read station from one interrecord gap to another, means for resetting said timeout means in response to each interrecord gap detected, and means for entering an error indicating binary digit in said status register, whereby a program is said central processing unit may test for an error in the immediately preceding input-output operation by transferring the contents of said status register to said central processing unit for inspection of said error indicating binary digit.

19. A system as defined in claim 18 wherein said magnetic tape unit employs a cassette for reel to reel winding with clear leader at each end, and wherein said timeout means includes means operative for inhibiting it from timing out while only writing and while erasing tape, and while winding tape either forward or backward, except while on said leader where lack of interrecord gaps will cause timeout for any operation of said magnetic tape unit.

20. A data processing system in which a central processing unit transfers blocks of data to a magnetic tape and recieves blocks of data from said magnetic tape through an interface unit under programmed instruction control of said central processing unit, said blocks of data stored on said magnetic tape being separated by blank inter-record gaps, said interface unit including a status register and, means for detecting inter-record gaps, time-out means for timing out a predetermined period greater than a maximum time required to drive said magnetic tape past a read station from one interrecord gap to another, means for resetting said timeout means in response to each interrecord gap detected, and means for entering an error indicating binary digit in said status register, whereby a program in said central processing unit may test for an error in the immediately prededing input-output operation by transferring the contents of said status register to said central processing unit for inspection of said error indicating binary digit.

21. A system as defined in claim 20 wherein said magnetic tape is housed in a cassette for reel to reel winding with clear leader at each end, and wherein said timeout means includes means operative for inhibiting it from timing out while only writing and while erasing tape, and while winding tape either forward or backward, except while on said leader where lack of interrecord gaps will cause timeout for any operation of said interface unit.

22. A data processing system in which a central processing unit transfers blocks of data to and receives blocks of data from magnetic tape through an interface unit under control of a programmed instruction in said central processing unit, said blocks of data being stored on said magnetic tape in succession, each with a header including an identification number used by said central processing unit for verification of data being addressed by said programmed instruction, each block of data being numbered in sequence from one end of said tape to the other in order for said central processing unit to keep track of magnetic tape position by counting up and down data blocks as tape is driven forward and backward in order to provide a tape position number for comparison with a block position number written as part of said identification number for verification when the block of data which follows on said magnetic tape is again accessed by said central processing unit, said header including a preamble of a predetermined binary code and said interface unit including means for detecting the first ones in sequence of less than the total number of binary digits in said code before commencing to record in response to an instruction from said central processing unit to rewrite a block of data over a recorded block, and means for automatically recording the balance of said preamble in synchronism, followed by said identification number and block of data whereby rewriting a block of data is synchronized by resynchronizing said preamble without requiring separate timing.

* * * * *